United States Patent
Asaoka et al.

(10) Patent No.: US 10,338,426 B2
(45) Date of Patent: Jul. 2, 2019

(54) LIGHT DIFFUSION MEMBER, BASE MATERIAL FOR LIGHT DIFFUSION MEMBER PRODUCTION, DISPLAY DEVICE USING SAME AND METHOD FOR PRODUCING LIGHT DIFFUSION MEMBER

(71) Applicant: Sharp Kabushiki Kaisha, Sakai, Osaka (JP)

(72) Inventors: Yasushi Asaoka, Sakai (JP); Tsuyoshi Maeda, Sakai (JP); Shohei Katsuta, Sakai (JP); Emi Yamamoto, Sakai (JP); Sho Ochi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 130 days.

(21) Appl. No.: 15/125,621

(22) PCT Filed: Mar. 11, 2015

(86) PCT No.: PCT/JP2015/057146
§ 371 (c)(1),
(2) Date: Sep. 13, 2016

(87) PCT Pub. No.: WO2015/137396
PCT Pub. Date: Sep. 17, 2015

(65) Prior Publication Data
US 2017/0003545 A1    Jan. 5, 2017

(30) Foreign Application Priority Data
Mar. 14, 2014   (JP) .................................. 2014-051977

(51) Int. Cl.
*G02B 5/30*    (2006.01)
*G02B 5/02*    (2006.01)
(Continued)

(52) U.S. Cl.
CPC ..... *G02F 1/133504* (2013.01); *G02B 5/0247* (2013.01); *G02B 5/0268* (2013.01);
(Continued)

(58) Field of Classification Search
CPC ......... G02F 1/133504; G02F 1/133528; G02F 1/13363; G02F 1/1336; G02F 1/1335;
(Continued)

(56) References Cited

U.S. PATENT DOCUMENTS

| | | | |
|---|---|---|---|
| 2002/0018162 A1* | 2/2002 | Suzuki | G02F 1/133632 349/117 |
| 2014/0253844 A1 | 9/2014 | Yamamoto et al. | |
| 2015/0160507 A1 | 6/2015 | Katsuta et al. | |

FOREIGN PATENT DOCUMENTS

| | | | |
|---|---|---|---|
| JP | 2000-352608 A | | 12/2000 |
| JP | 2002090527 | * | 3/2002 |

(Continued)

OTHER PUBLICATIONS

English translation of JP 2009093166, machine translated dated Jul. 8, 2018.*

(Continued)

*Primary Examiner* — Jie Lei
(74) *Attorney, Agent, or Firm* — Keating & Bennett, LLP

(57) ABSTRACT

According to an aspect of the present invention, there is provided a light diffusion member which includes a light diffusion film, a polarizing film, and a retardation film. The light diffusion film includes a first substrate, a light diffusion portion, and a light shielding layer. The polarizing film includes a second substrate and a polarization layer. The retardation film includes a third substrate and a retardation layer. The retardation layer is formed from a birefringence body which has optically-negative uniaxiality. An alignment direction of the birefringence body is different in a thickness (Continued)

direction thereof. A slow axis of the retardation layer is positioned at azimuth between a transmission axis and an absorption axis of the polarization layer.

20 Claims, 22 Drawing Sheets

(51) Int. Cl.
    *G02F 1/1335* (2006.01)
    *G02F 1/13363* (2006.01)
(52) U.S. Cl.
    CPC ......... *G02B 5/0278* (2013.01); *G02B 5/3033* (2013.01); *G02B 5/3083* (2013.01); *G02F 1/13363* (2013.01); *G02F 1/133528* (2013.01); *G02F 2001/133562* (2013.01); *G02F 2413/02* (2013.01); *G02F 2413/05* (2013.01); *G02F 2413/14* (2013.01)
(58) Field of Classification Search
    CPC ... G02F 1/133615; G02F 2001/133562; G02F 2413/14; G02F 2413/05; G02F 1/2001; G02F 1/133562; G02F 2413/02; G02B 5/3033; G02B 5/3083; G02B 5/02; G02B 5/0247; G02B 5/0278; G02B 5/0268; G02B 6/005; G02B 6/0051
    USPC ......... 359/489.06, 489.07, 489.11, 599, 707; 349/64, 65, 96
    See application file for complete search history.

(56) References Cited

FOREIGN PATENT DOCUMENTS

| | | |
|---|---|---|
| JP | 2003-248121 A | 9/2003 |
| JP | 2009-093166 A | 4/2009 |
| JP | 2013-186210 A | 9/2013 |
| WO | 2013/061875 A1 | 5/2013 |
| WO | 2014/024814 A1 | 2/2014 |

OTHER PUBLICATIONS

English translation of JP 2002090527, machine translated dated Jul. 8, 2018.*
Official Communication issued in International Patent Application No. PCT/JP2015/057146, dated Apr. 21, 2015.

* cited by examiner

40

40G

40H

40I

40J

40K

40L

LIGHT DIFFUSION MEMBER, BASE MATERIAL FOR LIGHT DIFFUSION MEMBER PRODUCTION, DISPLAY DEVICE USING SAME AND METHOD FOR PRODUCING LIGHT DIFFUSION MEMBER

TECHNICAL FIELD

The present invention relates to a light diffusion member, a base material for light diffusion member production, a display device using the light diffusion member, and a method of producing the light diffusion member.

This application is based upon and claims the benefit of priority of the prior Japanese Patent Application No. 2014-051977, filed on Mar. 14, 2014; the entire contents of which are incorporated herein by reference.

BACKGROUND ART

In general, a liquid crystal display device is widely used as a display for portable electronic equipment such as a portable telephone, a television, a personal computer, or the like. Generally, the liquid crystal display device has excellent viewability from the front, but has a narrow viewing angle. Thus, various considerations for widening the viewing angle have been performed. As one of the considerations, a configuration in which a member for controlling a diffusion angle of light emitted from a display body such as a liquid crystal panel is provided on a viewing side of the display body is proposed. The member for controlling the diffusion angle of light is referred to as a light diffusion member below.

The following PTL 1 discloses a light diffusion sheet in which a groove having a V-shaped cross-section is provided in a light diffusion layer, and a light absorptive layer is provided at a portion of the groove. Transparent sheets formed from polyethylene terephthalate (PET) are disposed on a light incoming side and the light outgoing side of the light diffusion layer in the light diffusion sheet. A portion of light which has been vertically incident to the light diffusion layer is totally reflected by a wall surface of the groove, and then is emitted. Thus, light emitted from the light diffusion sheet is diffused.

The following PTL 2 discloses that an optical compensation film which contains a liquid crystal compound formed from a discotic compound is disposed between a liquid crystal cell and a polarization layer, in order to improve contrast in a liquid crystal display device of the twisted-nematic (below abbreviated to TN) mode.

CITATION LIST

Patent Literature

PTL 1: Japanese Unexamined Patent Application Publication No. 2000-352608
PTL 2: Japanese Unexamined Patent Application Publication No. 2013-186210

SUMMARY OF INVENTION

Technical Problem

Only when the light diffusion sheet disclosed in PTL 1 and the optical compensation film disclosed in PTL 2 are singly used, in a case where an observer views a screen from a direction inclined from the front of a liquid crystal panel, there is a problem in that an angular range which allows viewing of high contrast display is narrow.

To solve the above problem, according to an aspect of the present invention, an object thereof is to provide a light diffusion member which can realize a display device having a wide angular range which allows viewing of high contrast display. According to another aspect of the present invention, an object thereof is to provide a method of producing a light diffusion member, which can easily produce this type of light diffusion member. According to still another aspect of the present invention, an object thereof is to provide a base material for light diffusion member production, which functions as an original plate when this type of light diffusion member is produced. According to still another aspect of the present invention, an object thereof is to provide a display device having a wide angular range which allows viewing of high contrast display.

Solution to Problem

To achieve the above objects, according to an aspect of the present invention, there is provided a light diffusion member which includes a light diffusion film, a polarizing film, and a retardation film. The light diffusion film includes a first substrate which has optical transparency, a light diffusion portion which is provided on a first surface of the first substrate, and a light shielding layer which is provided in a region of the first surface of the first substrate, other than a region in which the light diffusion portion is formed. The light diffusion portion includes a light-emitting end surface which is in contact with the first substrate, and a light incident end surface which faces the light-emitting end surface and has an area larger than an area of the light-emitting end surface. A height from the light incident end surface to the light-emitting end surface is larger than a thickness of the light shielding layer. The polarizing film includes a second substrate which has optical transparency and is disposed on the light incident end surface side of the light diffusion portion, and a polarization layer which has a transmission axis and an absorption axis which are provided on a first surface of the second substrate. The retardation film includes a third substrate which has optical transparency and is disposed on an opposite side of a side of the polarizing film, on which the light diffusion film is disposed, and a retardation layer which is formed from a birefringence body which has optically-negative uniaxiality and is provided on the first surface of the third substrate, and in which an alignment direction of the birefringence body is different in a thickness direction. A slow axis of the retardation layer is positioned at azimuth between the transmission axis and the absorption axis of the polarization layer.

In the light diffusion member according to the aspect of the present invention, the birefringence body which has optically-negative uniaxiality may be polymer of a discotic compound.

In the light diffusion member according to the aspect of the present invention, an azimuthal angle between the slow axis of the retardation layer and the transmission axis of the polarization layer may be about 45°.

In the light diffusion member according to the aspect of the present invention, the polarizing film may further include a fourth substrate which performs interposition of the polarization layer along with the second substrate, and the third substrate and the fourth substrate may be bonded to each other.

In the light diffusion member according to the aspect of the present invention, the polarization layer and the third substrate may be bonded to each other.

In the light diffusion member according to the aspect of the present invention, a member interposed between the polarizing film and the first substrate may have a refractive index which is in a range between a refractive index of the polarizing film and a refractive index of the first substrate.

The light diffusion member according to the aspect of the present invention may further include a buffer layer which is provided between the light diffusion portion of the light diffusion film and the polarizing film.

In the light diffusion member according to the aspect of the present invention, the light shielding layer may include a plurality of light shielding layers which are disposed so as to be dotted when viewed from a normal direction of the first surface of the first substrate, and the light diffusion portion may be continuously provided in a region other than a region in which the light shielding layer is formed.

In the light diffusion member according to the aspect of the present invention, a plurality of light shielding layers may be aperiodically disposed when viewed from a normal direction of the first surface of the first substrate.

In the light diffusion member according to the aspect of the present invention, the plurality of light shielding layers may include light shielding layers which have a size different from each other.

In the light diffusion member according to the aspect of the present invention, an air cavity obtained by partition of the light diffusion portion may be formed in the region in which the light shielding layer is formed, and the air cavity may be filled with air.

In the light diffusion member according to the aspect of the present invention, a planar shape of the light shielding layer when viewed from the normal direction of the first surface of the first substrate may be circular, oval, or polygonal.

In the light diffusion member according to the aspect of the present invention, an inclination angle of a side surface of one light diffusion portion may vary depending on a location of the light diffusion portion.

In the light diffusion member according to the aspect of the present invention, at least one of an antireflection layer, an antistatic layer, an antiglare treatment layer, and an antifouling treatment layer may be provided on a second surface of the first substrate.

In the light diffusion member according to the aspect of the present invention, the light shielding layer may be formed by any of black resin, a black ink, metal singleton, and a laminated film of metal singleton and metal oxide.

According to another aspect of the present invention, there is provided a display device which includes a display body and a light diffusion member which is provided on a light outgoing side of the display body, and causes an angular distribution of light incident from the display body to be wider than an angular distribution of light before the light is incident, so as to emit the light. The light diffusion member is the light diffusion member according to the aspect of the present invention.

In the display device according to another aspect of the present invention, the display body may have a plurality of pixels for forming a display image and have a configuration in which the maximum pitch between light diffusion portions which are adjacent to each other among the plurality of light diffusion portions in the light diffusion member is smaller than a pitch between the pixels in the display body.

According to a still another aspect of the present invention, there is provided a base material for light diffusion member production which includes a plurality of regions in which a light diffusion member including a light diffusion film, a polarizing film, and a retardation film is formed. The light diffusion film includes a first substrate which has optical transparency, a light diffusion portion which is provided on a first surface of the first substrate, and a light shielding layer which is provided in a region of the first surface of the first substrate, other than a region in which the light diffusion portion is formed. The light diffusion portion includes a light-emitting end surface which is in contact with the first substrate, and a light incident end surface which faces the light-emitting end surface and has an area larger than an area of the light-emitting end surface. A height from the light incident end surface to the light-emitting end surface is larger than a thickness of the light shielding layer. The polarizing film includes a second substrate which has optical transparency and is disposed on the light incident end surface side of the light diffusion portion, and a polarization layer which has a transmission axis and an absorption axis which are provided on a first surface of the second substrate. The retardation film includes a third substrate which has optical transparency and is disposed on an opposite side of a side of the polarizing film, on which the light diffusion film is disposed, and a retardation layer which is formed from a birefringence body which has optically-negative uniaxiality and is provided on the first surface of the third substrate, and in which an alignment direction of the birefringence body is different in a thickness direction. A slow axis of the retardation layer is positioned at azimuth between the transmission axis and the absorption axis of the polarization layer.

In the base material for light diffusion member production according to still another aspect of the present invention, a region in which the light shielding layer and the light diffusion portion are not provided may be provided at a circumferential portion of the first surface of the first substrate.

According to still another aspect of the present invention, there is provided a method of producing a light diffusion member. The method of producing a light diffusion member includes a step of manufacturing a light diffusion film which includes a first substrate having optical transparency, a light diffusion portion provided on a first surface of the first substrate, and a light shielding layer provided in a region of the first surface of the first substrate, other than a region in which the light diffusion portion, a step of manufacturing a polarizing film which includes a second substrate having optical transparency, and a polarization layer which is provided on a first surface of the second substrate, and has a transmission axis and an absorption axis, a step of manufacturing a retardation film which includes a third substrate having optical transparency, and a retardation layer which is provided on a first surface of the third substrate, and is formed from a layer in which an alignment direction of a birefringence body having uniaxiality is different in a thickness direction, a step of sticking the retardation film and the polarizing film to each other in a direction in which a slow axis of the retardation layer is positioned at azimuth between the transmission axis and the absorption axis of the polarization layer, and a step of sticking the polarizing film and the light diffusion film to each other. The light diffusion portion includes a light-emitting end surface being in contact with the first substrate, and a light incident end surface which faces the light-emitting end surface and has an area lager than an area of the light-emitting end surface, and a height from the light incident end surface to the light-emitting end surface is larger than a thickness of the light shielding layer.

Advantageous Effects of Invention

According to the aspect of the present invention, it is possible to provide a light diffusion member which can realize a display device having a wide angular range which allows viewing of high contrast display. According to the aspect of the present invention, it is possible to provide a method of producing a light diffusion member, which can easily produce this type of light diffusion member. According to the aspect of the present invention, it is possible to provide a base material for light diffusion member production, which functions as an original plate when this type of light diffusion member is produced. According to the aspect of the present invention, it is possible to provide a display device having a wide angular range which allows viewing of high contrast display.

DESCRIPTION OF EMBODIMENTS

[First Embodiment]

Hereinafter, a first embodiment of the present invention will be described with reference to FIGS. 1 to 18D.

The embodiment will be described with an example of a liquid crystal display device including a transmissive liquid crystal panel as a display device.

The "liquid crystal panel" in the embodiment corresponds to a "display body" in Claims.

In all of the following drawings, illustration may be made with varying a scale of dimensions depending on components, in order to easily show the components.

Figure 1:
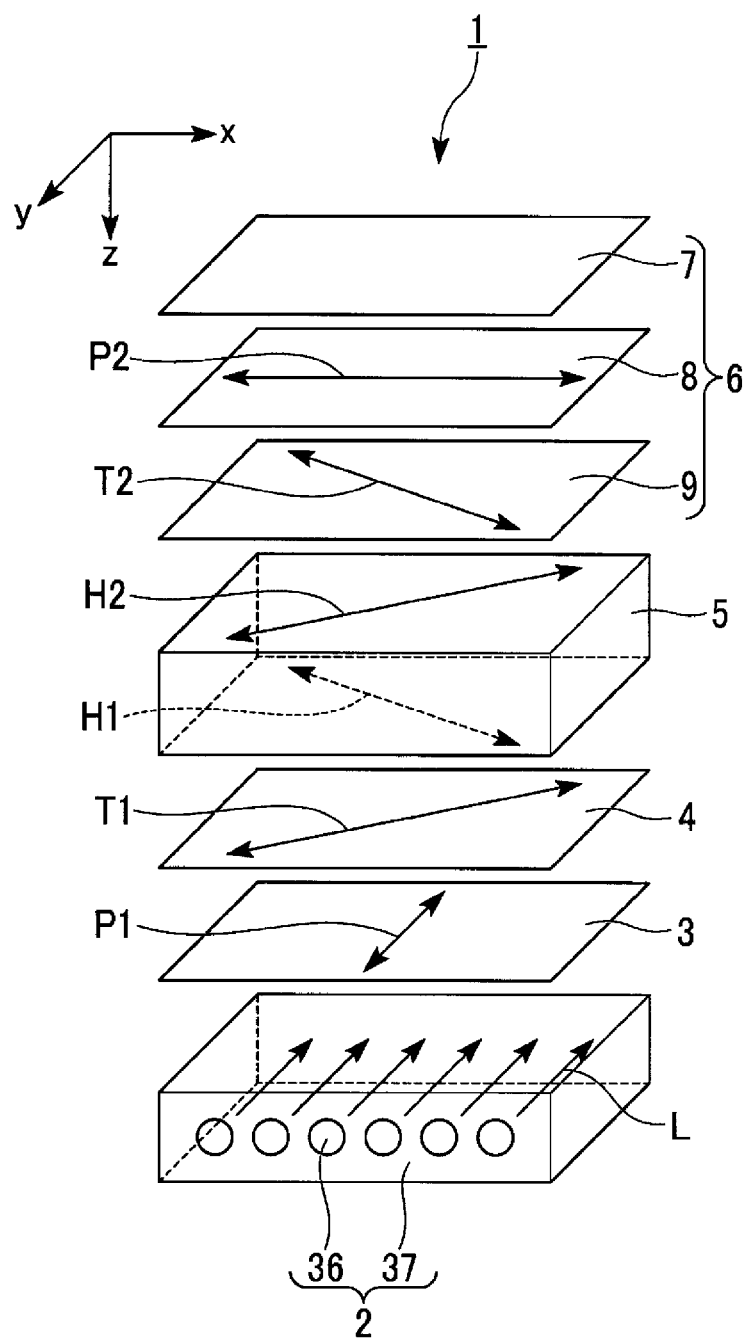
FIG. 1 is an exploded perspective view illustrating a liquid crystal display device according to a first embodiment of the present invention.
Figure 2:
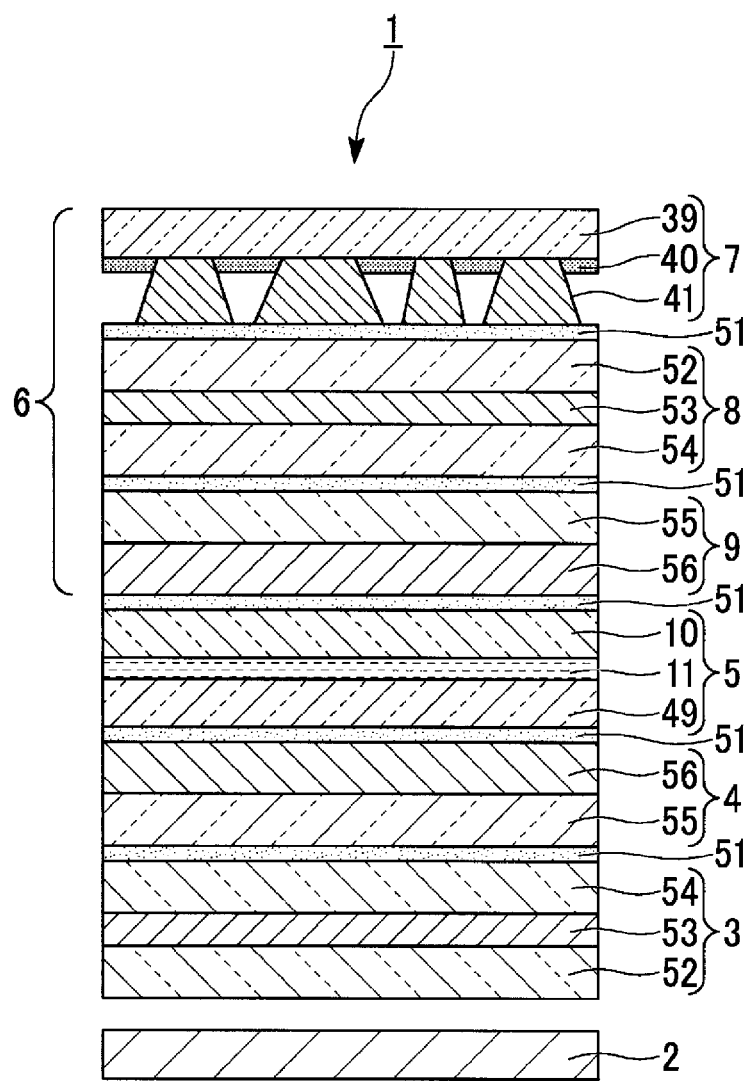
FIG. 2 is a sectional view illustrating the liquid crystal display device according to the first embodiment.

FIG. 1 is a perspective view when the liquid crystal display device according to the embodiment is viewed from a diagonally upper part (viewing side). FIG. 2 is a sectional view illustrating the liquid crystal display device.

As illustrated in FIGS. 1 and 2, the liquid crystal display device 1 according to the embodiment includes a backlight 2, a first polarizing film 3, a first retardation film 4, a liquid crystal panel 5, and a light diffusion member 6. In FIG. 1, for easily showing the figure, members are separately illustrated. However, the light diffusion member 6 is a member obtained by integrating the light diffusion film 7, the second polarizing film 8, and the second retardation film 9.

FIG. 1 schematically illustrates the liquid crystal panel 5 as one piece of plate. A detailed structure of the liquid crystal panel 5 will be described later.

It is assumed that an observer views a display from an upper side of the liquid crystal display device 1 in FIG. 1, on which the light diffusion member 6 is disposed. In the following descriptions, a side on which the light diffusion member 6 is referred to as a viewing side. A side on which the backlight 2 is disposed is referred to as a back side. In the following descriptions, an x axis is defined to be a horizontal direction of a screen of the liquid crystal display device 1. A y axis is defined to be a vertical direction of the screen of the liquid crystal display device 1. A z axis is defined to be a thickness direction of the liquid crystal display device 1.

In the liquid crystal display device 1 according to the embodiment, light which has been emitted from the backlight 2 is modulated in the liquid crystal panel 5, and the modulated light causes a prescribed image, a prescribed characters, or the like to be displayed. If the light which has been emitted from the liquid crystal panel 5 is transmitted to the light diffusion member 6, a state where luminous intensity distribution (diffusion angle distribution) of the emitted light becomes wider than that before the light is incident to the light diffusion member 6 occurs, and then the light is emitted from the light diffusion member 6.

Thus, an observer can view display with a wide viewing angle.

(Liquid Crystal Panel)

A specific configuration of the liquid crystal panel 5 will be described below.

Here, descriptions will be made by using an active matrix type transmissive liquid crystal panel as an example. The liquid crystal panel which can be applied to the present invention is not limited to the active matrix type transmissive liquid crystal panel. The liquid crystal panel which can be applied to the present invention may be, for example, a translucent (transmission-reflection combined type) liquid crystal panel. In addition, a simple matrix liquid crystal panel may be provided. In the simple matrix liquid crystal panel, each pixel does not include a thin film transistor (below abbreviated to a TFT) for switching.

Figure 3:
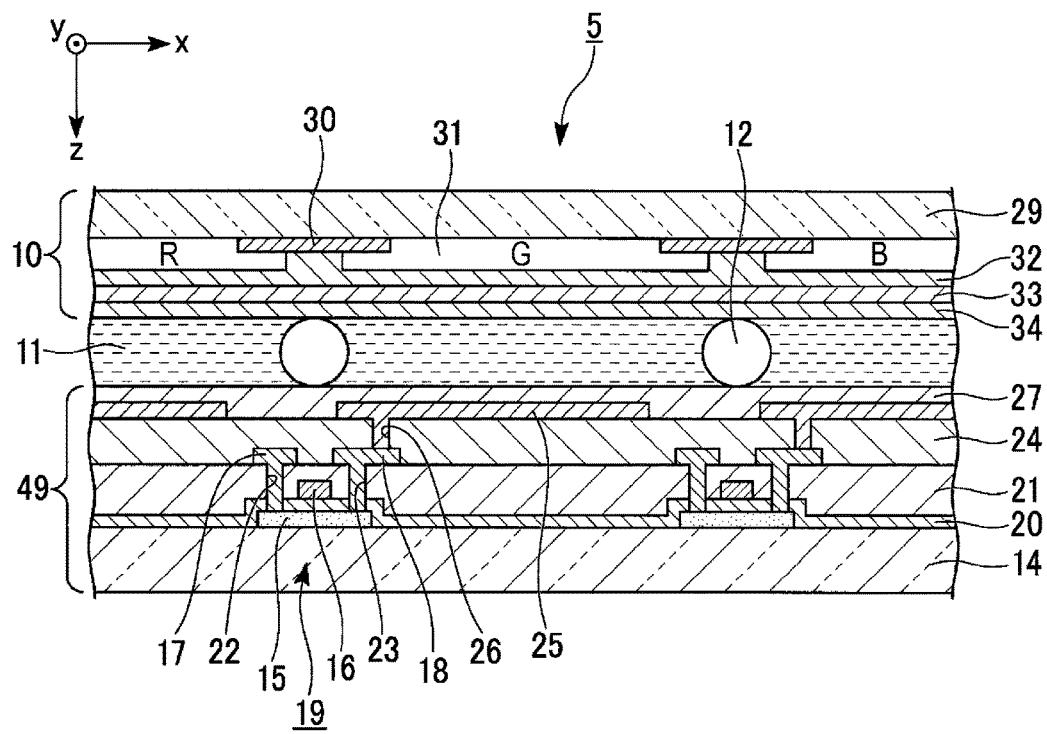
FIG. 3 is a sectional view illustrating a liquid crystal panel.

FIG. 3 is a vertically-sectional view illustrating the liquid crystal panel 5.

As illustrated in FIG. 3, the liquid crystal panel 5 includes a TFT substrate 49, a color-filter substrate 10, and a liquid crystal layer 11. The TFT substrate 49 functions as a switching-element substrate. The color-filter substrate 10 is disposed so as to face the TFT substrate 49. The liquid crystal layer 11 is interposed between the TFT substrate 49 and the color-filter substrate 10. The liquid crystal layer 11 is sealed in a space which is surrounded by the TFT substrate 49, the color-filter substrate 10, and a frame-shaped seal member (not illustrated). The TFT substrate 49 and the color-filter substrate 10 are stuck to each other at a prescribed gap by the seal member.

The liquid crystal panel 5 in the embodiment performs a display, for example, in a TN mode. Liquid crystal having positive dielectric anisotropy is used in the liquid crystal layer 11. A spacer 12 is disposed between the TFT substrate 49 and the color-filter substrate 10. The spacer 12 is spherical or columnar. The spacer 12 holds a gap between the TFT substrate 49 and the color-filter substrate 10, so as to be constant.

The display mode of the liquid crystal panel 5 according to the present invention is not limited to the TN mode. For example, a vertical alignment (VA) mode, a super twisted nematic (STN) mode, an in-plane switching (IPS) mode, a fringe field switching (FFS) mode, and the like may be used.

Although not illustrated, a plurality of pixels is disposed in the TFT substrate 49, so as to have a matrix shape.

A pixel is the smallest unit region in display. A plurality of source bus lines is formed on the TFT substrate 49, so as to be extended in parallel with each other. A plurality of gate bus lines is formed in the TFT substrate 49, so as to be extended in parallel with each other. The plurality of gate bus lines is orthogonal to the plurality of source bus lines, respectively. The plurality of source bus lines and the plurality of gate bus lines are formed on the TFT substrate 49, so as to have a lattice shape. A rectangular region obtained by subdivision of adjacent source bus lines and adjacent gate bus lines functions as one pixel. The source bus line is connected to a source electrode 17 of the TFT 19. The gate bus line is connected to a gate electrode 16 of the TFT 19.

The TFT 19 which includes a semiconductor layer 15, the gate electrode 16, the source electrode 17, and a drain electrode 18 is formed on a surface on the liquid crystal layer 11 side of a transparent substrate 14 constituting the TFT substrate 49. As the transparent substrate 14, for example, a glass substrate can be used. The semiconductor layer 15 is formed on the transparent substrate 14. As a material of the semiconductor layer 15, for example, a semiconductor material such as continuous grain silicon (CGS), low-temperature poly-silicon (LPS), and amorphous silicon (α-Si) is used.

A gate insulating film 20 is formed on the transparent substrate 14 so as to cover the semiconductor layer 15.

As a material of the gate insulating film 20, for example, a silicon oxide film, a silicon nitride film, a laminated film of the above films, and the like are used. The gate electrode 16 is formed on the gate insulating film 20 so as to face the semiconductor layer 15. As a material of the gate electrode 16, for example, a laminated film of W (tungsten)/TaN (tantalum nitride), Mo (molybdenum), Ti (titanium), Al (aluminum), and the like are used.

A first inter-layer insulating film 21 is formed on the gate insulating film 20 so as to cover the gate electrode 16. As a material of the first inter-layer insulating film 21, for example, a silicon oxide film, a silicon nitride film, a laminated film of the above films, and the like are used. The source electrode 17 and the drain electrode 18 are formed on the first inter-layer insulating film 21. A contact hole 22 and a contact hole 23 are formed in the first inter-layer insulating film 21 and the gate insulating film 20, so as to penetrate the first inter-layer insulating film 21 and the gate insulating film 20. The source electrode 17 is connected to a source region of the semiconductor layer 15 through the contact hole 22. The drain electrode 18 is connected to a drain region of the semiconductor layer 15 through the contact hole 23. As a material of the source electrode 17 and the drain electrode 18, a conductive material similar to that of the above-described gate electrode 16 is used.

A second inter-layer insulating film 24 is formed on the first inter-layer insulating film 21 so as to cover the source electrode 17 and the drain electrode 18. As a material of the second inter-layer insulating film 24, a material similar to that of the above-described first inter-layer insulating film 21, or an organic insulating material is used. A pixel electrode 25 is formed on the second inter-layer insulating film 24. A contact hole 26 is formed in the second inter-layer insulating film 24 so as to penetrate the second inter-layer insulating film 24. The pixel electrode 25 is connected to the drain electrode 18 through the contact hole 26. The pixel electrode 25 is connected to a drain region of the semiconductor layer 15 by using the drain electrode 18 as a relay electrode. As a material of the pixel electrode 25, for example, a transparent conductive material such as indium tin oxide (ITO), indium zinc oxide (IZO), and indium zinc oxide is used.

With this configuration, when a scanning signal is supplied through the gate bus line, and the TFT 19 is in an ON state, an image signal which has been supplied to the source electrode 17 through the source bus line is supplied to the pixel electrode 25 via the semiconductor layer 15 and the drain electrode 18. An alignment layer 27 is formed on the entire surface of the second inter-layer insulating film 24, so as to cover the pixel electrode 25. The alignment layer 27 has an anchoring force which causes liquid crystal molecules constituting the liquid crystal layer 11 to be horizontally oriented. As a form of the TFT 19, a top gate type TFT illustrated in FIG. 3 may be provided, and a bottom gate type TFT may be provided.

A black matrix 30, a color filter 31, a planarizing layer 32, a counter electrode 33, and an alignment layer 34 are sequentially formed on a surface on the liquid crystal layer 11 side of the transparent substrate 29 which constitutes the color-filter substrate 10. The black matrix 30 has a function of blocking transmission of light in regions between pixels. The black matrix 30 is formed by using a photoresist in which metal particles or carbon particles such as Cr (chrome) or a multilayer of Cr/oxidized Cr are dispersed in photosensitive resin.

The color filter 31 includes pigments of colors of red (R), green (G), and blue (B). A color filter 31 of any one of R, G, and B is disposed on one pixel electrode 25 on the TFT substrate 49, so as to face the pixel electrode 25. The color filter 31 may be configured so as to have many colors of three colors (R, G, and B) or more.

The planarizing layer 32 is configured by an insulating film, so as to cover the black matrix 30 and the color filter 31. The planarizing layer 32 has a function to reduce a level difference which may occur by the black matrix 30 and the color filter 31, so as to perform planarization. The counter electrode 33 is formed on the planarizing layer 32. As a material of the counter electrode 33, a transparent conductive material which is similar to the pixel electrode 25 is used. The alignment layer 34 is formed on the entire surface of the counter electrode 33. The alignment layer 34 has an anchoring force which causes liquid crystal molecules constituting the liquid crystal layer 11 to be horizontally oriented.

Returning to FIG. 1, the backlight 4 includes a light source 36 such as a light-emitting diode and a cold-cathode tube, and a light guide plate 37. The light guide plate 37 guides light emitted from the light source 36 to the liquid crystal panel 5. The light guide plate 37 includes an outgoing surface on which light is emitted toward the liquid crystal panel 5, and a back surface which faces the outgoing surface. A plurality of prisms (not illustrated) is formed on the back surface. Each of the prisms on the back surface includes two inclined surfaces (not illustrated) which are inclined to the outgoing surface at prescribed angles which are different from each other. Light emitted from the backlight 2 has strong intensity and high directivity in a normal direction on a display surface.

The backlight 2 may be an edge-light type in which such a light source 36 is disposed on an edge of the light guide plate 37. The backlight 2 may be a downlight type in which the light source is disposed just under a light guide body.

As the backlight 2 used in the embodiment, a backlight which controls an emitting direction of light and thus obtains directivity, that is, so-called a directive backlight is desirably used. The directive backlight is used so as to cause light which has been collimated or substantially collimated to be incident to the light diffusion portion 41 of the light diffusion member 6, and thus it is possible to reduce an amount of blurring and to improve use efficiency of light. Brightness distribution of the above directive backlight will be described later.

(Light Diffusion Member)

The light diffusion member 6 will be described below in detail.

Figure 4:
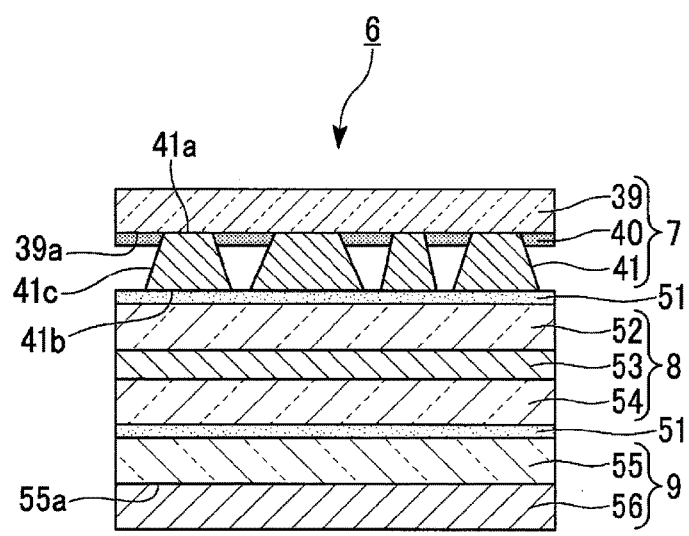
FIG. 4 is a sectional view illustrating a light diffusion member according to the first embodiment.

FIG. 4 is a sectional view illustrating the light diffusion member 6.

Figure 5:
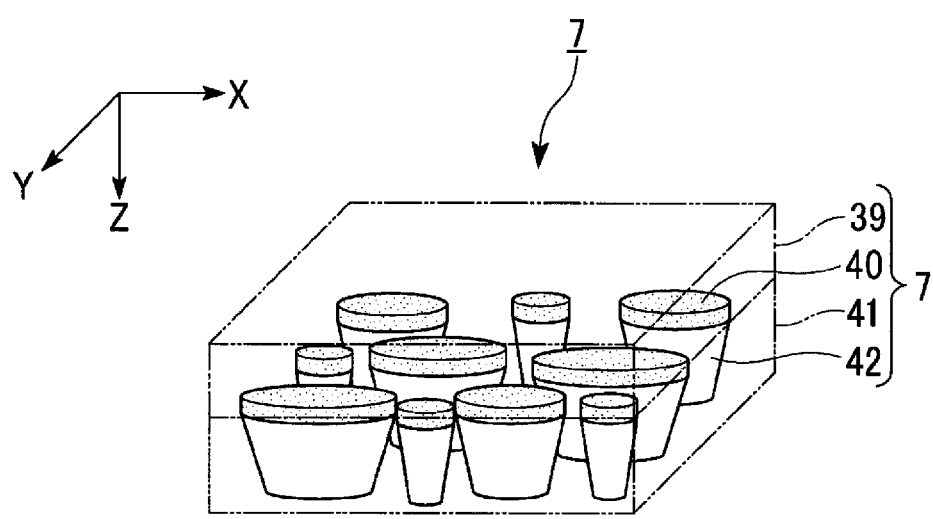
FIG. 5 is a perspective view illustrating a light diffusion film.

FIG. 5 is a perspective view illustrating the light diffusion film 7.

As illustrated in FIG. 4, the light diffusion member 6 has a configuration in which the light diffusion film 7, the second polarizing film 8, and the second retardation film 9 are stacked through adhesive layers 51.

As illustrated in FIGS. 4 and 5, the light diffusion film 7 includes a first substrate 39, a plurality of light shielding layers 40, and a light diffusion portion 41. The plurality of light shielding layers 40 is formed on a first surface 39a (surface on the back side) of the first substrate 39. The light diffusion portion 41 is formed in a region of the first surface 39a of the first substrate 39, other than a region in which the light shielding layer 40 is formed.

As illustrated in FIGS. 2 and 4, the light diffusion film 7 is disposed on the second polarizing film 8. The light diffusion film 7 is disposed with a posture in which a side of the light diffusion film 7, on which the light diffusion portion 41 is provided is directed toward the second polarizing film 8, and a side thereof, on which the first substrate 39 is provided is directed toward the viewing side. The light diffusion film 7 is fixed to the second polarizing film 8 through the adhesive layer 51.

As the first substrate 39, for example, a substrate which is formed of transparent resin, such as a triacetyl cellulose (TAC) film, a polyethylene terephthalate (PET), polycarbonate (PC), polyethylene naphthalate (PEN), and a polyether sulfone (PES) film is preferably used. In a producing process, the first substrate 39 functions as a base when coating with a material of the light shielding layer 40 or the light diffusion portion 41 will be performed later. The first substrate 39 necessarily has thermal resistance and mechanical strength in a thermal treatment process in the producing process. Thus, as the first substrate 39, a glass substrate and the like may be used in addition to the resin substrate. At this time, it is preferable that the thickness of the first substrate 39 is thin as long as the thermal resistance or the mechanical strength is not damaged. The reason is because a probability of blurring in display occurring becomes high as the thickness of the first substrate 39 is thick. The total light transmittance of the first substrate 39 is preferably equal to or more than 90% in the rule of JIS K7361-1. If the total light transmittance is equal to or more than 90%, sufficient transparency is obtained. In the embodiment, a transparent resin substrate having a thickness of 100 μm is used as an example.

The light shielding layer 40 is randomly disposed when viewed from a normal direction of the main surface in the first substrate 39. The light shielding layer 40 is configured of an organic material which has light-absorbing properties and photosensitive properties, such as a black resist and a black ink, as an example. In addition, a metal film such as a multi-layer of Cr (chrome) or Cr/oxidized Cr may be used. The organic material forming the light shielding layer 40 may include an ultraviolet absorptive substance which absorbs ultraviolet rays.

The light diffusion portion 41 is configured of, for example, an organic material which has optical transparency and photosensitive properties, such as acrylic resin and epoxy resin. The total light transmittance of the light diffusion portion 41 is preferably equal to or more than 90% in the rule of JIS K7361-1. If the total light transmittance is equal to or more than 90%, sufficient transparency is obtained.

As illustrated in FIG. 4, the light diffusion portion 41 includes a light-emitting end surface 41a, a light incident end surface 41b, and a reflective surface 41c. The light-emitting end surface 41a is a surface which is in contact with the first substrate 39. The light incident end surface 41b is a surface which faces the light-emitting end surface 41a. The reflective surface 41c is a tapered side surface of the light diffusion portion 41. The reflective surface 41c is a surface on which light incident from the light incident end surface 41b is reflected. The area of the light incident end surface 41b is larger than the area of the light-emitting end surface 41a.

The light diffusion portion 41 is a portion of the light diffusion film 7, which contributes to light transmission. That is, light which has been incident to the light diffusion portion 41 is totally reflected by the reflective surface 41c of the light diffusion portion 41, and is guided in a state of being substantially shut up in the light diffusion portion 41. Then, the light is emitted.

The light diffusion film 7 is disposed so as to cause the first substrate 39 to be directed toward the viewing side. Thus, among two facing surfaces of the light diffusion portion 41, a surface having a smaller area functions as the light-emitting end surface 41a. A surface having a larger area functions as the light incident end surface 41b.

An inclination angle of the reflective surface 41c of the light diffusion portion 41 (angle between the light incident end surface 41b and the reflective surface 41c) is preferably from 75° to 85°. In the embodiment, the inclination angle of the reflective surface 41c of the light diffusion portion 41 is 75°. At this time, the inclination angle of the reflective surface 41c of the light diffusion portion 41 is not particularly limited as long as the angle is formed so as to allow incident light to be sufficiently diffused when light is emitted from the light diffusion member 6. In the embodiment, the inclination angle of the reflective surface 41c of the light diffusion portion 41 is set to be constant.

The height from the light incident end surface 41b to the light-emitting end surface 41a of the light diffusion portion 41 is set to be larger than a layer thickness of the light shielding layer 40. In a case of the embodiment, the layer thickness of the light shielding layer 40 is about 150 nm, for example. The height from the light incident end surface 41b to the light-emitting end surface 41a of the light diffusion portion 41 is about 20 μm, for example. A portion surrounded by the reflective surface 41c of the light diffusion portion 41 and the light shielding layer 40 functions as an air cavity 42.

It is desirable that the refractive index of the first substrate 39 be substantially equal to the refractive index of the light diffusion portion 41. The reason is as follows. For example, a case where the refractive index of the first substrate 39 is largely different from the refractive index of the light diffusion portion 41 is considered. In this case, when light which has been incident from the light incident end surface 41b is emitted from the light diffusion portion 41, refraction or reflection of light may unnecessarily occur at an interface between the light diffusion portion 41 and the first substrate 39. In this case, a problem, for example, in that a desired viewing angle is not obtained, or light intensity of emitted light is reduced may occur.

In a case of the embodiment, the air cavity 42 (outside of the light diffusion portion 41) is filled with air. Thus, if the light diffusion portion 41 is formed of, for example, transparent acrylic resin, the reflective surface 41c of the light diffusion portion 41 functions as an interface between the transparent acrylic resin and the air. Here, the air cavity 42 may be filled with other materials which have a low refractive index. However, regarding a refractive index difference at the interface between the inside and the outside of the light diffusion portion 41, the refractive index difference in a case where the air is provided is larger (maximum) than the refractive index difference in a case where a certain material having a low refractive index is provided on the outside.

Thus, the Snell's law causes a critical angle in the configuration in the embodiment to become smallest and causes an incident angle range to become widest. In the incident angle range, light is totally reflected by the reflective surface 41c of the light diffusion portion 41. As a result, it is possible to suppress loss of light and to obtain high luminance.

Providing a material which has a low refractive index in the embodiment indicates that the surroundings of the light diffusion portion 41 is in a state of a low refractive index, in order to allow light to be totally reflected. Thus, it is assumed that a case where an inert gas such as nitrogen is filled with the air cavity 42 instead of the air is included. In addition, the inside of the air cavity 42 may be in a vacuum state or a state of being decompressed more than the air.

Figure 6:
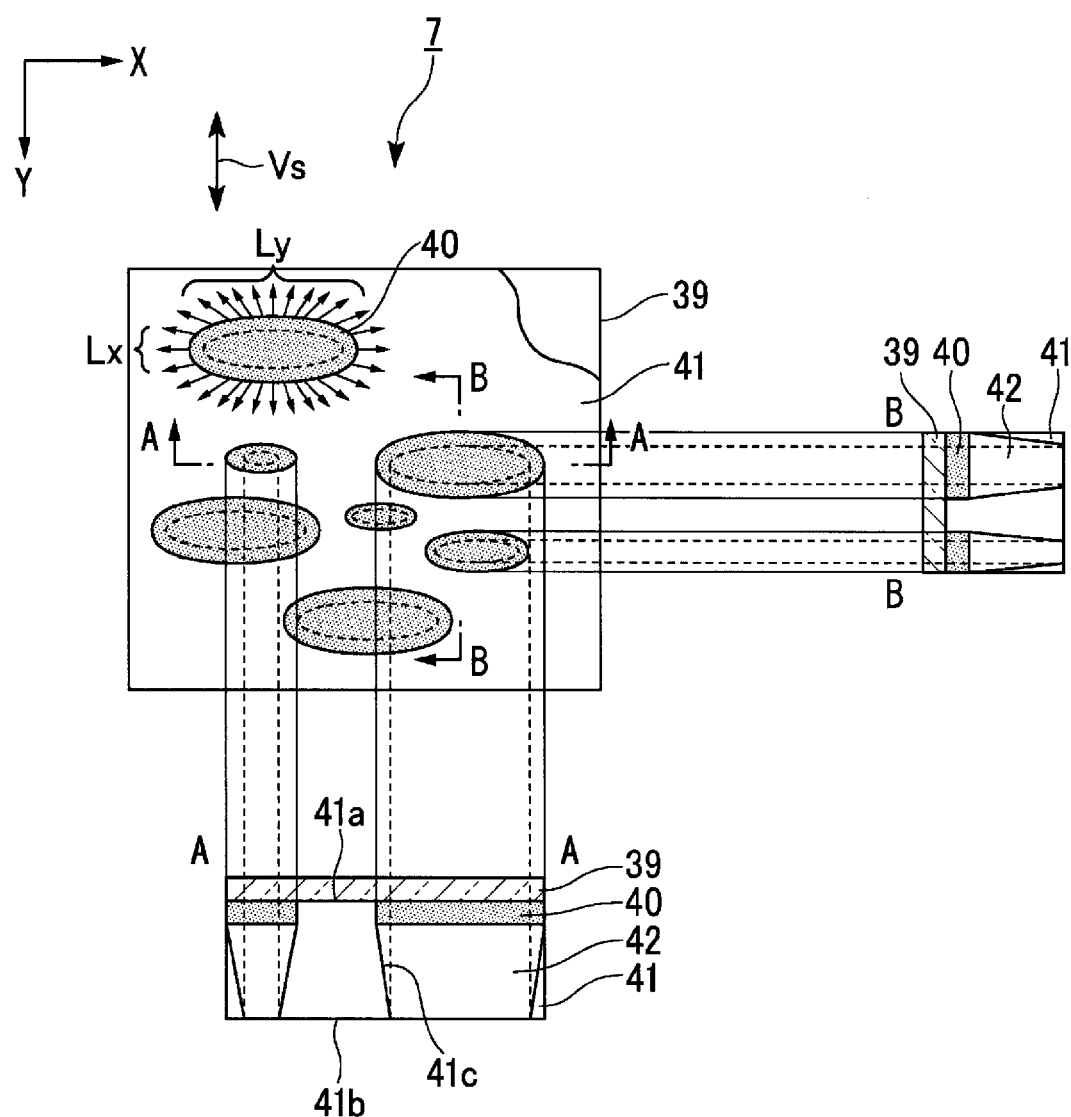
FIG. 6 is a plan view illustrating the light diffusion film and a sectional view when the light diffusion film is viewed in two directions.

FIG. 6 is a schematic diagram illustrating the light diffusion film 6. In FIG. 6, an upper left part is a plan view illustrating the light diffusion film 6. A lower left part is a sectional view taken along line A-A of the plan view at the upper left part. An upper right part is a sectional view taken along line B-B of the plan view at the upper left part.

As illustrated at the upper left part of FIG. 6, a plurality of light shielding layers 40 is provided on a surface of the first substrate 39 so as to be dotted in the light diffusion film 6. A planar shape of the light shielding layer 40 when viewed from the normal direction of the first substrate 39 is oval. The light shielding layer 40 has a major axis and a minor axis. Here, the major axis is an axis in which the length of the light shielding layer 40 is longest in the planar shape when the light shielding layer 40 is viewed from the normal direction of the first substrate 39.

The minor axis is an axis in which the length of the light shielding layer 40 is shortest in the planar shape when the light shielding layer 40 is viewed from the normal direction of the first substrate 39. In the light diffusion film 6, regarding the light shielding layers 40, a length ratio of the length in the minor axis to the length in the major axis is substantially equal.

As illustrated at the lower left part and the upper right part of FIG. 6, a portion corresponding to a lower part of the light shielding layer 40 is the air cavity 42 which has an elliptical frustum shape. The light diffusion member 6 includes a plurality of air cavities 42. The light diffusion portion 41 is continuously provided at a portion other than the portion of the plurality of air cavities 42.

A major-axial direction of an oval which is a planar shape of each of the light shielding layers 40 is substantially aligned in an X direction. The major-axial direction of the oval may be referred below to as a major-axial direction of the light shielding layer. A minor-axial direction of the oval which is the planar shape of each of the light shielding layers 40 is substantially aligned in a Y direction. The minor-axial direction of the oval may be referred below to as a minor-axial direction of the light shielding layer. Thus, if a direction of the reflective surface 41c of the light diffusion portion 41 is considered, a percentage of the reflective surface 41c along the X direction is more than a percentage of the reflective surface 41c along the Y direction, in the reflective surface 41c of the light diffusion portion 41. Accordingly, the quantity of light Ly which is reflected by the reflective surface 41c along the X direction, and then is diffused in the Y direction is more than the quantity of light Lx which is reflected by the reflective surface 41c along the Y direction, and then is diffused in the X direction.

Accordingly, an azimuthal angle direction Vs in which diffusibility of the light diffusion member 6 is strongest corresponds to the Y direction which is the minor-axial direction of the light shielding layer 40. A polar angle direction is randomly set. Definitions of the polar angle and the azimuthal angle will be described later.

In a case where the planar shape of the light shielding layer is circular, a percentage of the reflective surface along the X direction is equal to a percentage of the reflective surface along the Y direction, in the reflective surface of the light diffusion portion. Thus, the quantity of light which is reflected by the reflective surface along the X direction, and then is diffused in the Y direction is more than the quantity of light which is reflected by the reflective surface along the Y direction, and then is diffused in the X direction. That is, when viewed from the normal direction of the substrate, light is isotropically reflected from the reflective surface. Accordingly, an azimuthal angle direction in which diffusibility of the light diffusion member is strongest is not provided.

Returning to FIG. 4, the second polarizing film 8 has a configuration in which a second substrate 52, a polarization layer 53, and a fourth substrate 54 are stacked in this order from the light diffusion film 7 side. The second substrate 52 and the fourth substrate 54 have optical transparency. The second substrate 52 is disposed on the light incident end surface 41b side of the light diffusion portion 41 in the light diffusion film 7. The polarization layer 53 has a transmission axis and an absorption axis which are orthogonal to each other, and are provided on a first surface of the second substrate 52. The fourth substrate 54 performs interposition of the polarization layer 53 along with the second substrate 52.

As the second substrate 52 and the fourth substrate 54, for example, a film which is formed of transparent resin such as TAC, PET, PC, PEN, and PES is preferably used. The second substrate 52 and the fourth substrate 54 may be the same as each other, or may be different from each other. In the embodiment, a TAC film having a thickness of 100 μm is used for the second substrate 52 and the fourth substrate 54. The polarization layer 53 is configured, for example, by a polyvinyl alcohol layer in which adhered iodine is provided, and the iodine is oriented.

The second retardation film 9 has a configuration in which a third substrate 55 and a retardation layer 56 are stacked in this order from the second polarizing film 8 side. The third substrate 55 is disposed on an opposite side of a side of the second polarizing film 8, on which the light diffusion film 7 is disposed. The third substrate 55 has optical transparency. The retardation layer 56 is configured from a birefringence body. The birefringence body is provided on a first surface 55a of the third substrate 55 and has optically-negative uniaxiality. In the retardation layer 56, an alignment direction of the birefringence body is different in a thickness direction thereof.

The third substrate 55 of the second retardation film 9 is bonded to the fourth substrate 54 of the second polarizing film 8 through the adhesive layer 51.

For example, a film which is formed of transparent resin such as TAC, PET, PC, PEN, and PES is preferably used for the third substrate 55. The third substrate 55 may be the same as the second substrate 52 and the fourth substrate 54, or may be different from the second substrate 52 and the fourth substrate 54. In the embodiment, a TAC film having a thickness of 100 μm is used for the third substrate 55. The retardation layer 56 is configured, for example, by a layer in which a discotic liquid crystal compound is subjected to hybrid orientation. The discotic liquid crystal compound corresponds to the birefringence body which has optically-negative uniaxiality.

Returning to FIG. 2, the first polarizing film 3 and the first retardation film 4 are provided between the backlight 2 and the liquid crystal panel 5, in this order from the backlight 2 side. The first retardation film 4 is bonded to the liquid crystal panel 5 through the adhesive layer 51. The first polarizing film 3 is bonded to the first retardation film 4 through the adhesive layer 51. The configuration of the first polarizing film 3 is the same as that of the above-described second polarizing film 8. The configuration of the first retardation film 4 is the same as that of the above-described second retardation film 9. Thus, this configuration is obtained by excluding the light diffusion film 7 from the light diffusion member 6 which is provided on the viewing side. That is, a layered body of the second polarizing film 8 and the second retardation film 9 has an equivalent configuration to a configuration in which the components between the backlight 2 and the liquid crystal panel 5 are provided so as to be reversed.

The first polarizing film 3 functions as a polarizer. If an angle is indicated counterclockwise by using a positive direction of an x-axial direction as a reference, as illustrated in FIG. 1, an absorption axis P1 of the first polarizing film 3 is set to a direction of 90° and −270°. The second polarizing film 8 in the light diffusion member 6 functions as an analyzer. An absorption axis P2 of the second polarizing film 8 is disposed so as to be orthogonal to the absorption axis P1 of the first polarizing film 3. The absorption axis P2 of the second polarizing film 8 is set to be a direction of 0° and −180°. That is, the absorption axis P1 of the first polarizing film 3 and the absorption axis P2 of the second polarizing film 8 are disposed in a relation of crossed Nicols.

In FIG. 1, an alignment control direction of the alignment layer 27 in the TFT substrate 49 is indicated by an arrow H1. The alignment control direction of the alignment layer 27 in the TFT substrate 49 is referred below to as an alignment control direction H1. An alignment control direction of the alignment layer 34 in the color-filter substrate 10 is indicated by an arrow H2. The alignment control direction of the alignment layer 34 in the color-filter substrate 10 is referred below to as an alignment control direction H2.

The alignment layer 27 is subjected to alignment treatment such as rubbing, so as to cause the alignment control direction H1 to be a direction of 135° and −315°. The alignment layer 34 is subjected to alignment treatment such as rubbing, so as to cause the alignment control direction H2 to be a direction of 45° and −225°.

A direction of the slow axis of the first retardation film 4 is indicated by an arrow T1. The direction of the slow axis of the first retardation film 4 is referred below to as a slow axial direction T1. A direction of the slow axis of the second retardation film 9 is indicated by an arrow T2. The direction of the slow axis of the second retardation film 9 is referred below to as a slow axial direction T2.

The first retardation film 4 is disposed so as to cause the slow axial direction T1 to be directed in a direction of 45° and −225°. That is, the slow axial direction T1 and the alignment control direction H2 match with each other. The second retardation film 9 is disposed so as to cause the slow axial direction T2 to be directed in a direction of 135° and −315°.

That is, the slow axial direction T2 and the alignment control direction H1 match with each other.

Focusing on the light diffusion member 6, the absorption axial direction P2 of the second polarizing film 8 corresponds to the direction of 0° and −180°, the transmission axial direction of the second polarizing film 8 corresponds to the direction of 90° and −270°. The slow axial direction T2 of the second retardation film 9 corresponds to the direction of 135° and −315°. The slow axis of the second retardation film 9 is positioned at azimuth between the transmission axial direction and the absorption axial direction of the second polarizing film 8. Particularly, in a case of the embodiment, an azimuthal angle between the slow axial direction of the second retardation film 8 and the transmission axis of the second polarizing film 8 is 45°.

Figure 7A:
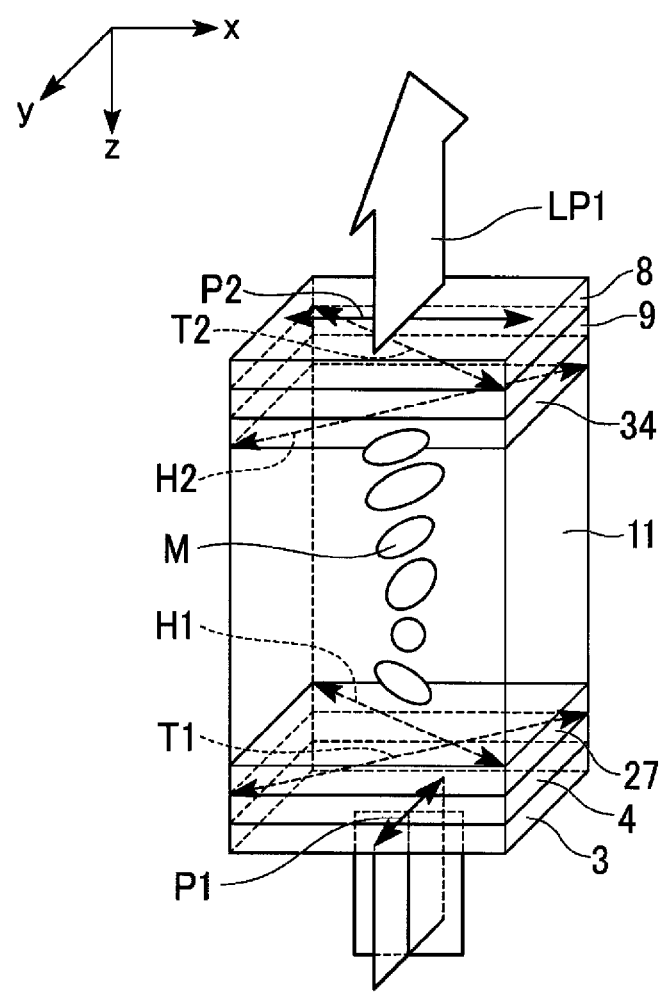
FIG. 7A is a first diagram illustrating an operation of the liquid crystal panel.
Figure 7B:
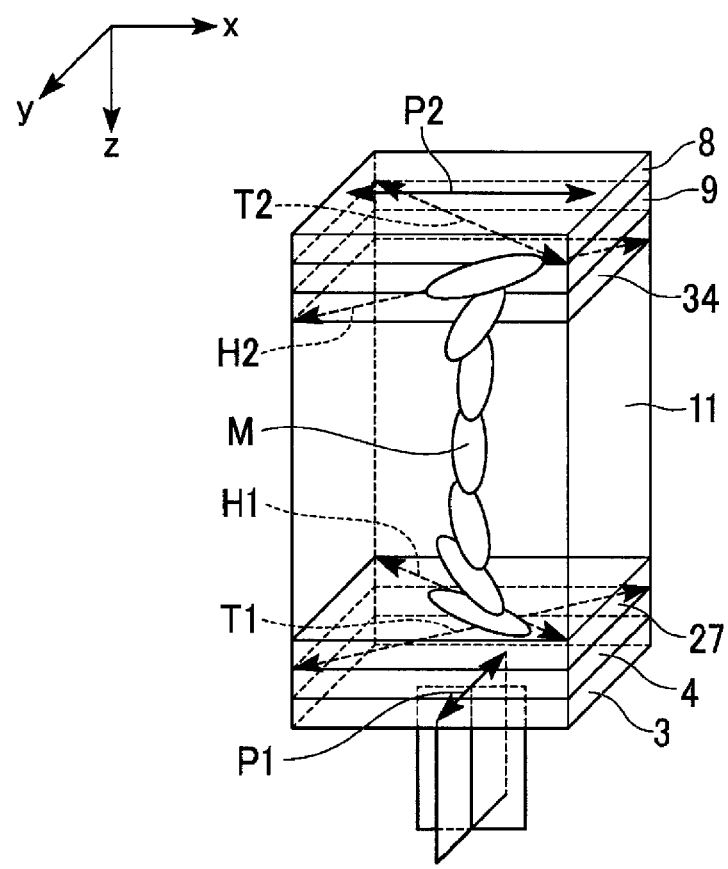
FIG. 7B is a second diagram illustrating an operation of the liquid crystal panel.

FIGS. 7A and 7B are diagrams illustrating an operation of the liquid crystal panel 5.

FIG. 7A is a diagram illustrating a state when a voltage is not applied to the liquid crystal panel 5 (between the pixel electrode 25 and the counter electrode 33 which are illustrated in FIG. 3) (during a non-voltage application period). FIG. 7B is a diagram illustrating a state when a constant voltage is applied to the liquid crystal panel 5 (during a voltage application period). In FIGS. 7A and 7B, a reference sign M indicates liquid crystal molecules constituting the liquid crystal layer 11.

As illustrated in FIG. 7A, the liquid crystal molecule M is in a state of being twisted by 90°, between the alignment layer 27 and the alignment layer 34 during the non-voltage application period. At this time, a polarization plane of the linearly-polarized light obtained by transmission of light to the first polarizing film 3 having a transmission axis which is a direction of 0° and −180° (absorption axis P1 which is a direction of 90° and −270°) is rotated by 90°. The rotation occurs by optical activity of the liquid crystal layer 11. Thus, the linearly-polarized light obtained by transmission of light to the first polarizing film 3 is transmitted to the second polarizing film 8 having a transmission axis which is a direction of 90° and −270° (absorption axis P2 which is a direction of 0° and −180°). As a result, white is displayed during the non-voltage application period.

As illustrated in FIG. 7B, the liquid crystal molecule M is in a state of standing in a direction along an electric field, between the alignment layer 27 and the alignment layer 34 during the voltage application period. At this time, the polarization plane of the linearly-polarized light obtained by transmission of light to the first polarizing film 3 having a transmission axis which is a direction of 0° and −180° (absorption axis P1 which is a direction of 90° and −270°) is not rotated. Thus, the linearly-polarized light obtained by transmission of light to the first polarizing film 3 is not transmitted to the second polarizing film 8 having a transmission axis which is a direction of 90° and −270°. As a result, black is displayed during the voltage application period.

As described above, it is controlled whether or not a voltage is applied is controlled, for each pixel, and thus it is possible to perform switching between white display and black display, and to display an image.

Figure 8:
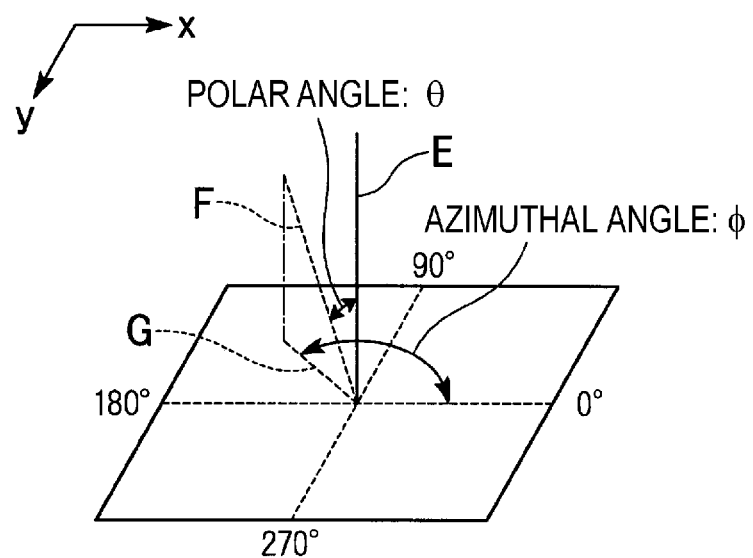
FIG. 8 is a diagram illustrating definitions of a polar angle and an azimuthal angle.

FIG. 8 is a diagram for explaining definitions of the polar angle and the azimuthal angle.

Here, as illustrated in FIG. 8, an angle of an observer to a sight line direction F, which uses a normal direction E of the screen of the liquid crystal display device 1 as a reference is set to be a polar angle θ. An angle to a direction of a line segment G, which uses the positive direction (direction of 0°) of the x axis is set to be an azimuthal angle φ. The line segment G is obtained when the sight line direction F of the observer is projected onto the screen.

Figure 9:
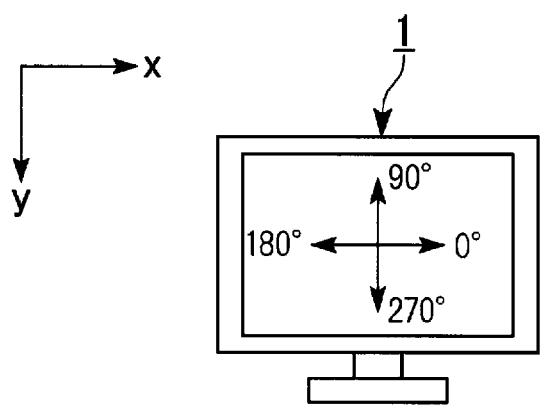
FIG. 9 is a front view illustrating the liquid crystal display device.

FIG. 9 is a front view illustrating the liquid crystal display device 1.

As illustrated in FIG. 9, a horizontal direction (x-axial direction) is set to be a direction of an azimuthal angle φ: 0° and −180° in the screen of the liquid crystal display device 1. Plainly, the direction of an azimuthal angle φ: 0° and −180° is a right-and-left direction. Specifically, the direction of an azimuthal angle φ: 0° and −180° is a direction along an axis horizontal to the ground. A vertical direction (y axial direction) is set to be a direction of an azimuthal angle φ: 90° and −270°. Plainly, the direction of an azimuthal angle φ: 90° and −270° is an up-and-down direction. Specifically, the direction of an azimuthal angle φ: 90° and −270° is a direction along an axis perpendicular to the ground.

Figure 10:
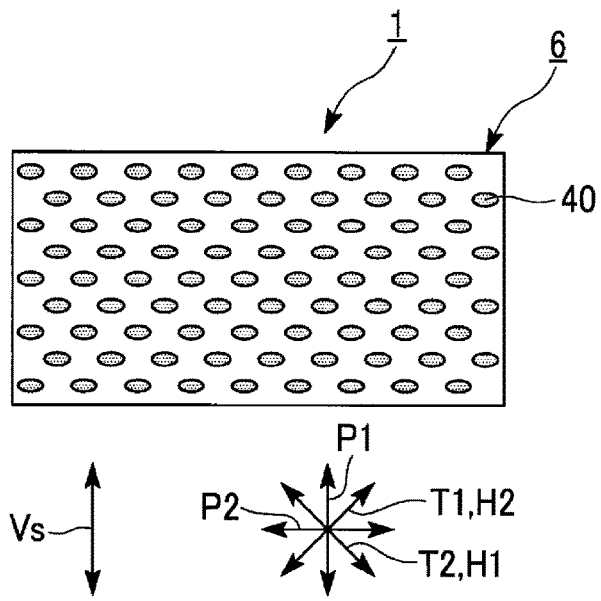
FIG. 10 is a diagram illustrating a disposition relationship between an absorption axis of a polarizing film and a slow axis of a retardation film in the front view of the liquid crystal display device.

FIG. 10 is a diagram illustrating a disposition relationship in the front view of the liquid crystal display device 1 according to the embodiment. The disposition relationship illustrated in FIG. 10 is a relationship between an azimuthal angle direction Vs of the light diffusion member 6, which has relatively strong diffusibility, the absorption axis of each of the polarizing films (absorption axis P1 of the first polarizing film 3 and absorption axis P2 of the second polarizing film 8), each of the retardation films (slow axis T1 of the first retardation film and slow axis T2 of the second retardation film), and alignment control directions H1 and H2. For convenience, in FIG. 9, the plurality of light shielding layers 40 has the same size and is regularly disposed.

As illustrated in FIG. 10, a shape of the front of the liquid crystal display device 1 in the embodiment is a (laterally-long) rectangle of which the length in the right-and-left direction is long. In the embodiment, the azimuthal angle direction Vs of the light diffusion member 6, which has relatively strong diffusibility is the direction of an azimuthal angle φ: 90° and −270°. Thus, diffusion intensity in the up-and-down direction in the liquid crystal display device 1 is increased, and viewability in the up-and-down direction is improved more.

In the embodiment, the azimuthal angle direction Vs of the light diffusion member 6, which has relatively strong diffusibility is substantially parallel to a short side of the light diffusion member 6. That is, in the embodiment, the azimuthal angle direction Vs of the light diffusion member 6, which has relatively strong diffusibility and the absorption axis P2 of the second polarizing film 8 form an angle of 90 degrees. The azimuthal angle direction Vs of the light diffusion member 6, which has relatively strong diffusibility is substantially parallel to the absorption axis P1 of the first polarizing film 3.

It is not necessary that the azimuthal angle direction Vs of the light diffusion member 6, which has relatively strong diffusibility is completely parallel to the short side of the light diffusion member 6. The azimuthal angle direction Vs may be substantially parallel to the short side of the light diffusion member 6. Generally, it is considered that a shift in a rotation direction in positioning between a liquid crystal panel and a polarizing plate is within about 5°, in an assembly process of a liquid crystal display device. Thus, the azimuthal angle direction Vs of the light diffusion member 6, which has relatively strong diffusibility may be shifted to the short side of the light diffusion member 6, by about 5°.

(Method of Producing Liquid Crystal Display Device)

A method of producing the liquid crystal display device 1 in the embodiment will be described below.

Figure 11:
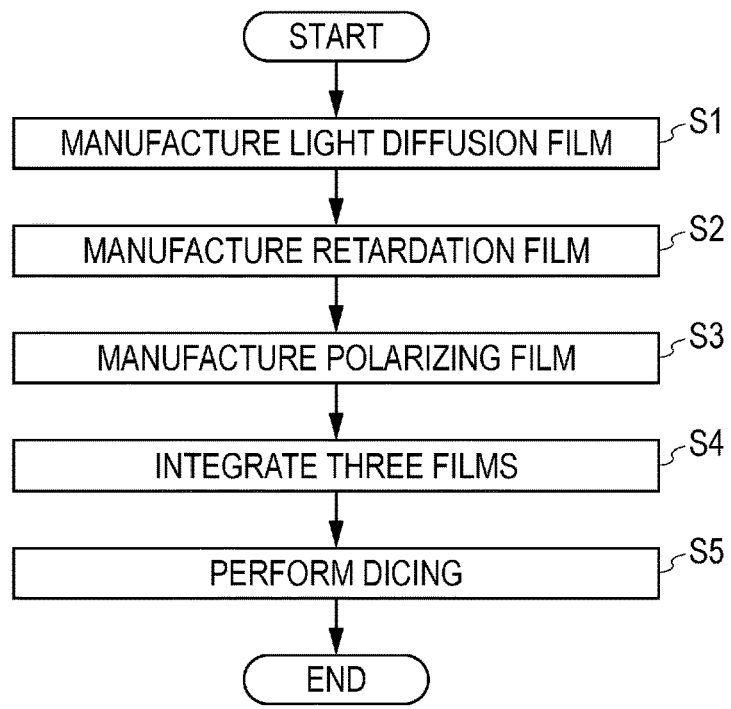
FIG. 11 is a flowchart illustrating a method of producing the light diffusion member.
Figure 12A:
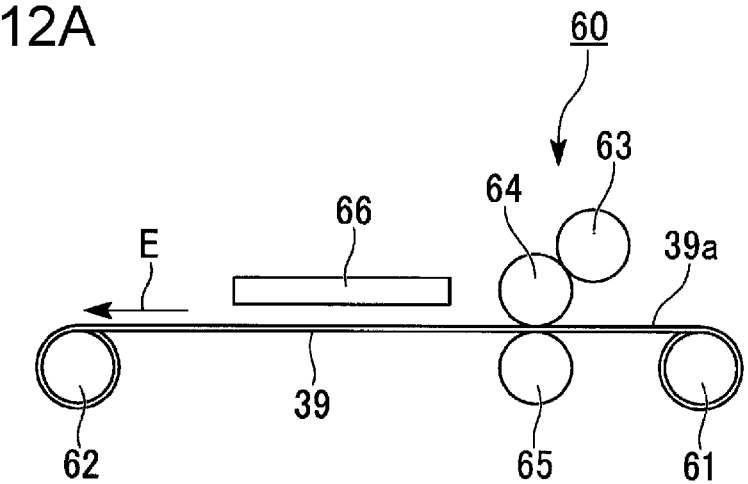
FIG. 12A is a first diagram illustrating a process of producing the light diffusion film.
Figure 12B:
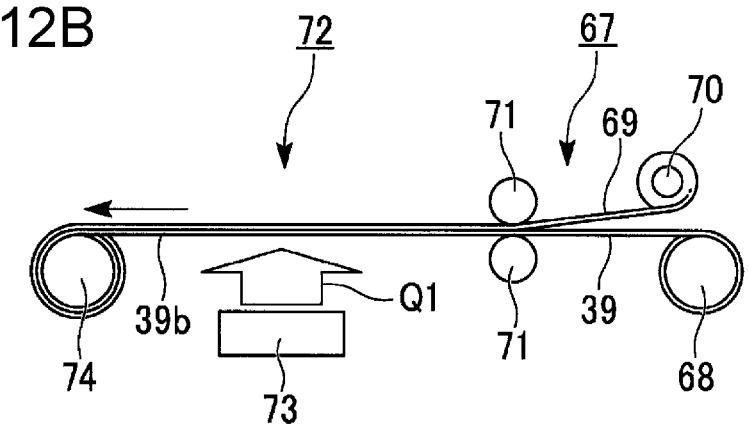
FIG. 12B is a second diagram illustrating the process of producing the light diffusion film.
Figure 12C:
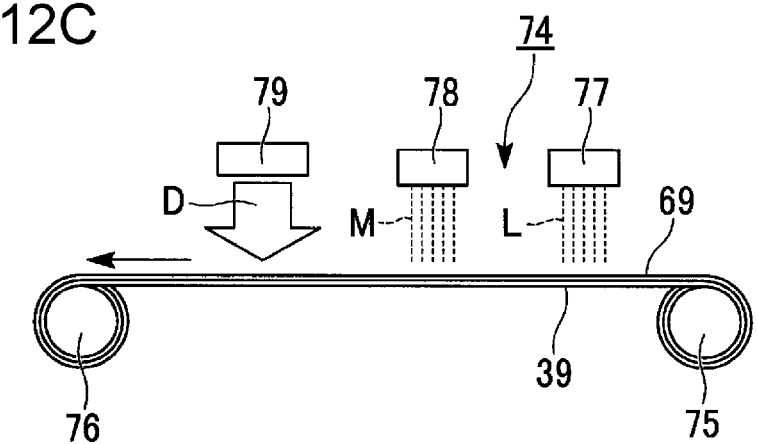
FIG. 12C is a third diagram illustrating the process of producing the light diffusion film.
Figure 13A:
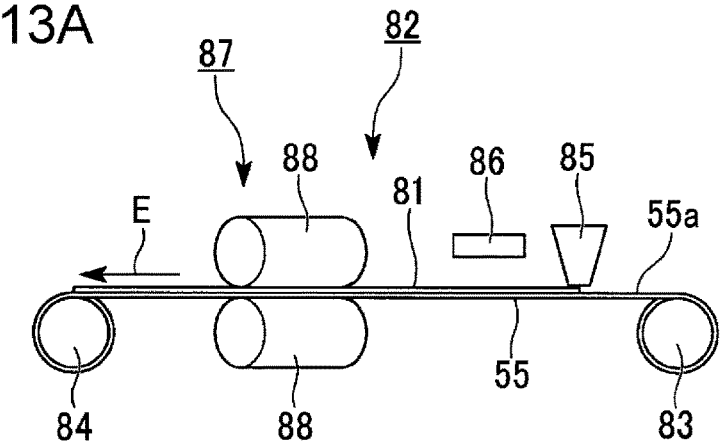
FIG. 13A is a first diagram illustrating a process of producing the retardation film.
Figure 13B:
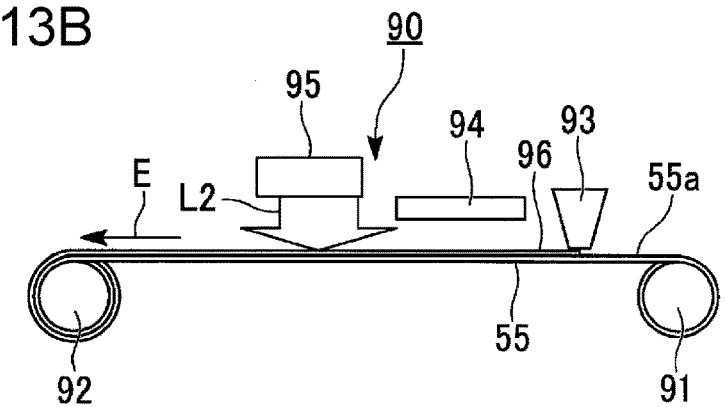
FIG. 13B is a second diagram illustrating the process of producing the retardation film.
Figure 14:
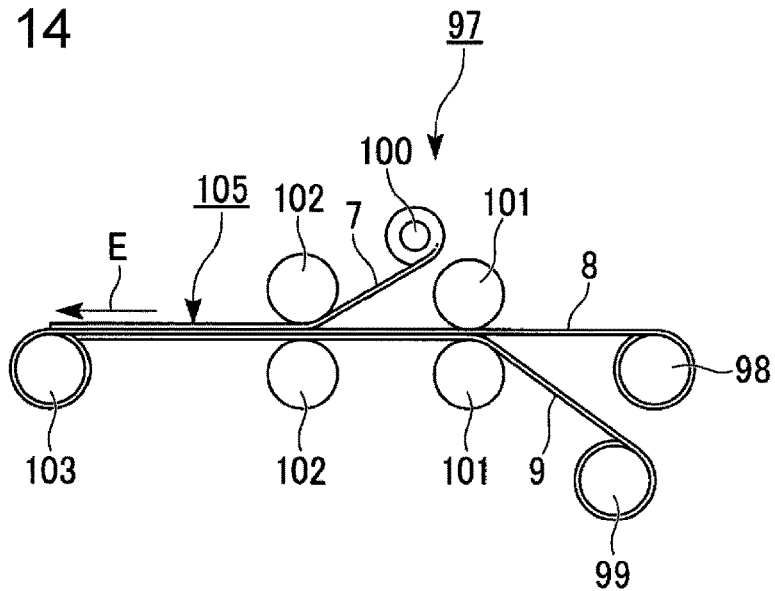
FIG. 14 is a diagram illustrating a process of sticking between the light diffusion film, the polarizing film, and the retardation film.

FIG. 11 is a flowchart illustrating a method of producing the light diffusion member 6. FIGS. 12A to 12C are diagrams illustrating a producing process of the light diffusion film 7. FIGS. 13A and 13B are diagrams illustrating a second retardation film 9. FIG. 14 is a diagram illustrating a sticking process between the light diffusion film 7, the second polarizing film 8, and the second retardation film 9.

The producing method will be described focused on a process of producing the light diffusion member 6 which constitutes the liquid crystal display device 1 having the above configuration.

An outline of a process of producing the liquid crystal panel 5 will be described ahead. Firstly, each of the TFT substrate 49 and the color-filter substrate 10 is manufactured. Then, a surface of the TFT substrate 49 on a side on which the TFT 19 is formed, and a surface of the color-filter substrate 10 on a side on which the color filter 31 is formed are disposed so as to face each other. The TFT substrate 49 and the color-filter substrate 10 are stuck to each other through the seal member. Then, liquid crystal is injected into a space which is surrounded by the TFT substrate 49, the color-filter substrate 10, and the seal member. The liquid crystal panel 5 is completed through the above processes.

As a producing method of the TFT substrate 49 or the color-filter substrate 10, a general method may be used, and descriptions thereof will be omitted.

Next, a process of producing the light diffusion member 6 will be described.

Firstly, the light diffusion film 7 is manufactured (Step S1 in FIG. 11).

When the light diffusion film 7 is manufactured, at first, for example, a pattern for the plurality of light shielding layers 40 is formed on the first surface 39a of the first substrate 39 which is formed from a TAC film. Here, an example in which the pattern of the light shielding layers 40 is formed by using an offset printing method will be described. As a method of forming the pattern of the light shielding layers 40, a gravure printing method, a mask exposure method, an ink jet method, and the like can be used in addition to the offset printing method. As a material of the light shielding layer 40, for example, black resin, a black ink which contains carbon, or the like is used.

As illustrated in FIG. 12A, a printing device 60 is used for transporting the long first substrate 39 in a direction of an arrow E by a roll-to-roll method, and for performing printing processing during a period of the transportation. A sending roller 61 for sending the first substrate 39 is provided at one end of the printing device 60, and a winding roller 62 for winding the first substrate 39 is provided at another end thereof. The first substrate 39 is moved from the sending roller 61 side toward the winding roller 62 side. A plate cylinder 63 and a blanket cylinder 64 are provided over the first surface 39a of the first substrate 39. An impression cylinder 65 is provided under the first substrate 39. A drying device 66 is provided on a downstream side of the plate cylinder 63 and the blanket cylinder 64. The drying device 66 is used for drying printed black resin, printed black ink, or the like.

Then, a negative photosensitive resin layer is formed on the first surface 39a of the first substrate 39, on which the pattern of the light shielding layers 40 has been formed. As a method of forming the photosensitive resin layer, a method such as lamination of a dry film resist formed from the photosensitive resin layer, slit coating, and printing is provided. Here, an example in which the photosensitive resin layer is formed by using the lamination method will be described. As illustrated in FIG. 12B, a first sending roller 68, a second sending roller 70, a pair of hot rollers 71, and a winding roller 74 are provided in a laminating device 67. The first sending roller 68 sends the first substrate 39 on which the light shielding layer 40 is formed. The second sending roller 70 sends a dry film resist 69. The first substrate 39 sent from the first sending roller 68, and the dry film resist 69 sent from the second sending roller 70 are stuck to each other by the pair of hot rollers 71.

An exposure device 72 is provided on a downstream side of the laminating device. A light source 73 which emits diffused light Q1 is provided under the first substrate 39. Here, irradiation with UV light having a prescribed diffusion angle is performed from the second surface 39b (lower surface) side of the first substrate 39 toward the dry film resist 69. At this time, because the light shielding layers 40 function as a mask, a region other than a region in which the light shielding layers 40 are formed, in the entire region of the dry film resist 69 is exposed.

As illustrated in FIG. 12C, a developing device 74 transports the first substrate 39 to which the dry film resist 69 subjected to exposure treatment is attached, by the roll-to-roll method, and performs developing processing during a period of the transportation. A sending roller 75 is provided at one end of the developing device 74. The sending roller 75 sends the first substrate 39. A winding roller 76 is provided at another end of the developing device 74. The winding roller 76 winds the first substrate 39. The first substrate 39 is moved from the sending roller 75 side toward the winding roller 76 side.

A liquid developer supply device 77 is provided over the first substrate 39. The liquid developer supply device 77 supplies a liquid developer L.

An aqueous cleaning device 78 which supplies pure water M, and a drying device 79 are provided on a downstream side of the liquid developer supply device 77, in this order. The drying device 79 supplies dried air D for drying the first substrate 39 which has been wet by the pure water M. The dry film resist 69 after exposure is developed with the liquid developer L, and a tapered portion at which transparent resin remains is set as the light diffusion portion 41. The transparent resin after developing is washed with pure water by the aqueous cleaning device 78. The transparent resin after washing is dried by the drying device 79.

The light diffusion film 7 is manufactured through the above processes.

Then, the second retardation film 9 is manufactured (Step S2 in FIG. 11).

When the second retardation film 9 is manufactured, at first, for example, an alignment layer 81 is formed on the first surface 55a of the third substrate 55 which is formed from a TAC film.

As illustrated in FIG. 13A, an alignment layer forming device 82 is used for transporting the long third substrate 55 by a roll-to-roll method, and for forming the alignment layer 81 during a period of the transportation. A sending roller 83 which sends the third substrate 55 is provided at one end of the alignment layer forming device 82. A winding roller 84 which winds the third substrate 55 is provided at another end of the alignment layer forming device 82. The third substrate 55 is moved from the sending roller 83 side toward the winding roller 84 side.

A coating device 85 is provided over the first surface 55a of the third substrate 55. For example, the coating device 85 coats the third substrate 55 with an alignment layer forming material such as polyimide. A drying device 86 is provided on a downstream side of the coating device 85. The alignment layer forming material after coating is dried by the drying device 86. A rubbing device 87 is provided on a downstream side of the drying device 86. The rubbing device 87 includes a pair of rubbing rollers 88. A rotation axis of the rubbing roller 88 is disposed so as to have an angle of 45° to a movement direction E of the third substrate 55. The rotation of the rubbing rollers 88 causes a surface of the alignment layer forming material to be subjected to rubbing treatment at an angle of 45° to the movement direction E of the third substrate 55. Thus, the alignment layer 81 is formed on the first surface 55a of the third substrate 55. A method of forming the alignment layer 81 is not limited to the rubbing method. A photosensitive alignment layer may be applied, and then alignment may be performed by using polarized UV light. Alignment processing of an angle of 45° to the movement direction E of the third substrate 55 may be performed on the surface of the alignment layer forming material. The alignment processing is performed by using a photo-alignment technology.

As illustrated in FIG. 13B, a retardation layer forming device 90 is used for transporting the third substrate 55 which has the attached alignment layer 81, by using a roll-to-roll method, and for forming the retardation layer 56 during a period of transportation. A sending roller 91 which sends the third substrate 55 is provided at one end of the retardation layer forming device 90. A winding roller 92 which winds the third substrate 55 is provided at another end of the retardation layer forming device 90. The third substrate 55 is moved from the sending roller 91 side to the winding roller 92 side.

A coating device 93 is provided over the first surface 55a of the third substrate 55. For example, the coating device 93 coats the alignment layer 81 with a triphenylene discotic compound in which a cross-linked group is provided at a termination of a side chain. A heating device 94 is provided on a downstream side of the coating device 93. The discotic compound 96 after coating is heated by the heating device 94, thereby obtaining a discotic nematic phase. After that, the discotic compound 96 is irradiated with UV light L2 from a UV light source 95, and thus a cross-linking reaction occurs. After the alignment of the discotic compound 96 is fixed, the temperature is brought back to room temperature. With such a process, an aligned state when the cross-linking reaction of the discotic compound 96 occurs is maintained even at the room temperature.

The discotic compound 96 causes a surface of a disk which is a shape of the discotic compound 96 to be oriented toward in-plane which is parallel to the first surface 55a of the third substrate 55, on the alignment layer 81 side. In addition, the discotic compound 96 causes the surface of a disk to be oriented toward in-plane which is substantially perpendicular to the first surface 55a of the third substrate 55. That is, the discotic compound 96 employs the spray-bend-hybrid orientation.

Figure 17:
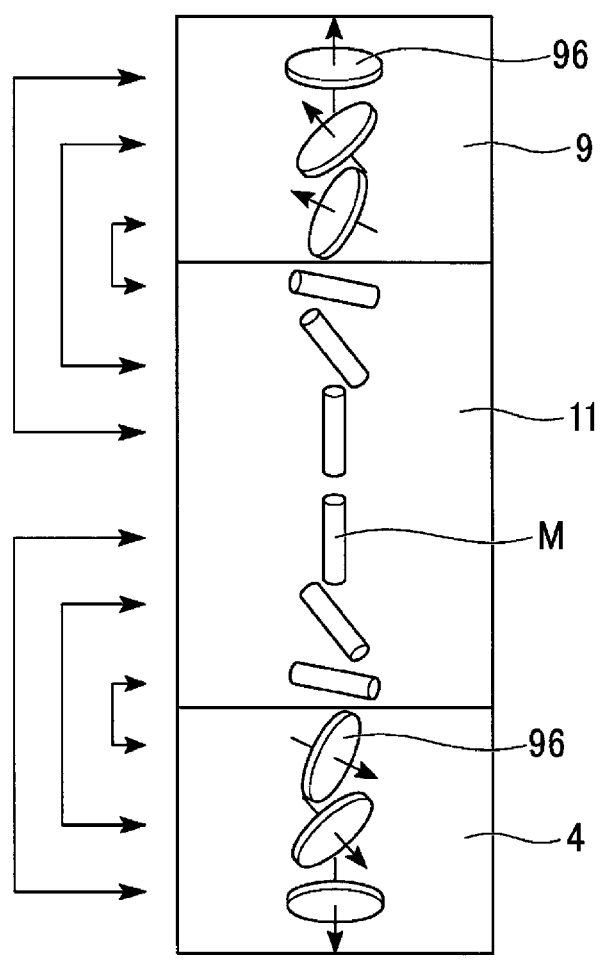
FIG. 17 is a diagram illustrating an action of the retardation film.

As illustrated in FIG. 17, this type of second retardation film 9 and the first retardation film 4 are provided on both sides of the liquid crystal layer 11 in the TN mode, and thus compensation is optically applied to oriented components of the liquid crystal layer 11 when a voltage is applied, by the retardation films 9 and 4.

Then, the second polarizing film 8 is manufactured (Step S3 in FIG. 11).

Although illustration is omitted, when the second polarizing film 8 is manufactured, the manufacturing is performed as follows. For example, a PVA film in which an iodine compound is impregnated is extended, and is subjected to cross-linking treatment. Then, washing and drying is performed, and the PVA film is interposed by using two pieces of TAC films which function as substrates. When the polarizing film is manufactured, such a general technique is used.

In FIG. 11, as an example of a flowchart, processes of "manufacturing a light diffusion film", "manufacturing a retardation film", and "manufacturing a polarizing film" are described in this order. However, only if these three types of films are manufactured separately, a manufacturing order is particularly not a problem.

Then, the light diffusion film 7, the second retardation film 9, and the second polarizing film 8 which have been separately manufactured are stuck to each other so as to be integrated, thereby a base material for light diffusion member production is manufactured (Step S4 in FIG. 11).

At this time, a film laminating device 97 as illustrated in FIG. 14 may be used.

The film laminating device 97 includes a polarizing film sending roller 98, a retardation film sending roller 99, a light diffusion film sending roller 100, a pair of first laminating rollers 101, a pair of second laminating rollers 102, and a winding roller 103.

In the film laminating device 97, the second polarizing film 8 which has been sent from the polarizing film sending roller 98, and the second retardation film 9 which has been sent from the retardation film sending roller 99 are stuck to each other by the first laminating roller 101. At this time, the second polarizing film 8 and the second retardation film 9 are stuck to each other so as to cause the slow axis of the second retardation film 9 to be positioned at azimuth between the transmission axis and the absorption axis of the second polarizing film 8. Specifically, sticking is performed so as to cause the slow axis of the second retardation film 9 and the transmission axis of the second polarizing film 8 to form an angle of about 45°.

Then, a laminated body of the second polarizing film 8 and the second retardation film 9, and the light diffusion film 7 which has been sent from the light diffusion film sending roller 100 are stuck to each other by the second laminating roller 102. A laminated body obtained by sticking the three types of film to each other is wound by the winding roller 92. In this manner, the base material for light diffusion member production 105 is completed in a state of being wound by the winding roller 103.

Then, the base material for light diffusion member production 105 is subjected to dicing, and thus a plurality of light diffusion member 6 is manufactured all together (Step S5 in FIG. 11).

Figure 15A:
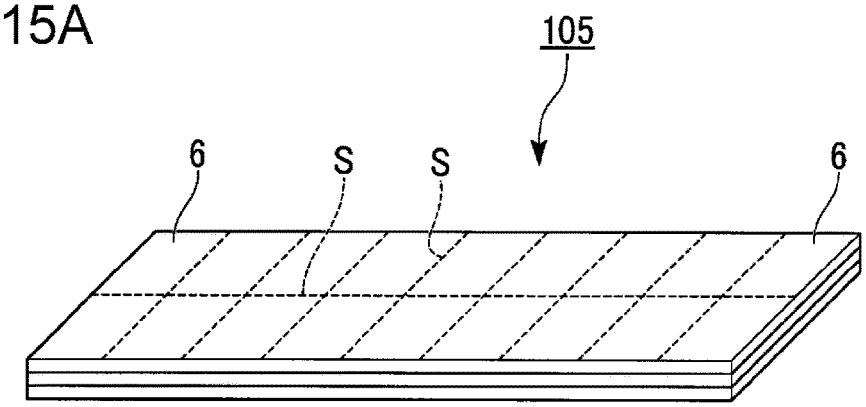
FIG. 15A is a perspective view illustrating a base material for light diffusion member production, according to the first embodiment.
Figure 15B:
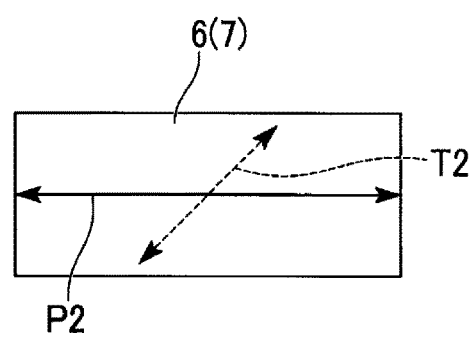
FIG. 15B is a front view illustrating a relationship in an optical axis between the polarizing film and the retardation film on a viewing side.
Figure 15C:
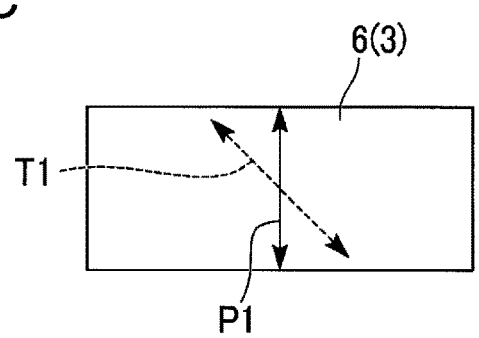
FIG. 15C is a front view illustrating a relationship in an optical axis between the polarizing film and the retardation film on a backlight side.

In a case of the embodiment, as illustrated in FIG. 15B, a direction of the absorption axis P2 of the light diffusion film 7 matches with a longitudinal direction (horizontal direction) of the light diffusion member 6 obtained by dicing. As illustrated in FIG. 15C, a direction of the absorption axis P1 of the first polarizing film 3 matches a short direction (vertical direction) of the light diffusion member 6 obtained by dicing. Thus, when the base material for light diffusion member production 105 is subjected to dicing, as illustrated in FIG. 15A, the base material for light diffusion member production 105 is cut along cutting-plane lines S which are parallel to the longitudinal direction and the short direction of the base material for light diffusion member production 105, a plurality of light diffusion member 6 in which a direction of each optical axis is optimized can be manufactured all together. Accordingly, it is possible to cut down the plurality of light diffusion members 6 from the base material for light diffusion member production 105 without being wasted, and it is possible to increase the number of pieces of the light diffusion members 6 obtained from the base material for light diffusion member production 105 which has a prescribed area.

Figure 16A:
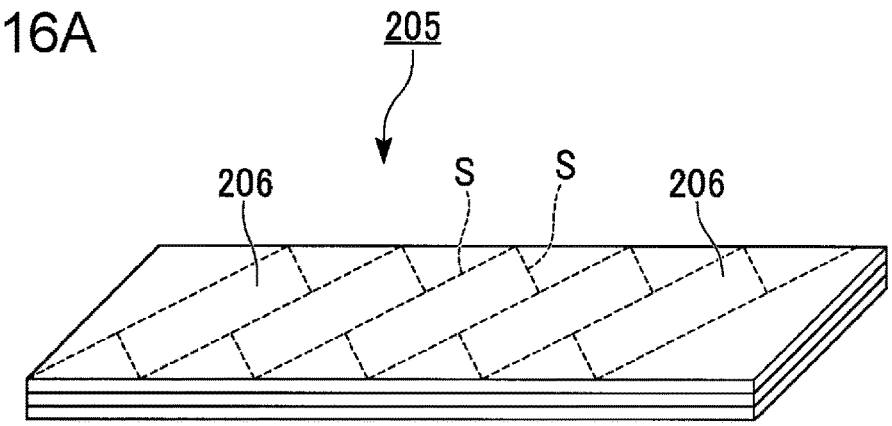
FIG. 16A is a perspective view illustrating a base material for light diffusion member production in a conventional example.
Figure 16B:
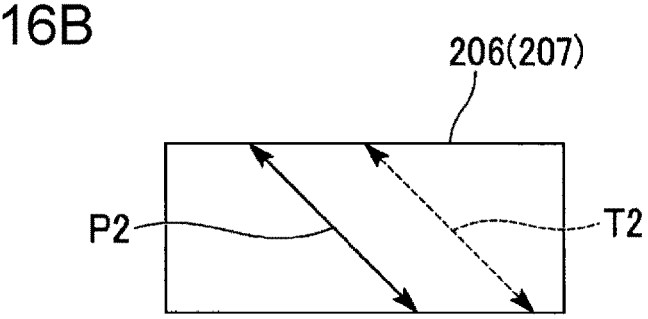
FIG. 16B is a front view illustrating a relationship in an optical axis between the polarizing film and the retardation film on the viewing side.
Figure 16C:
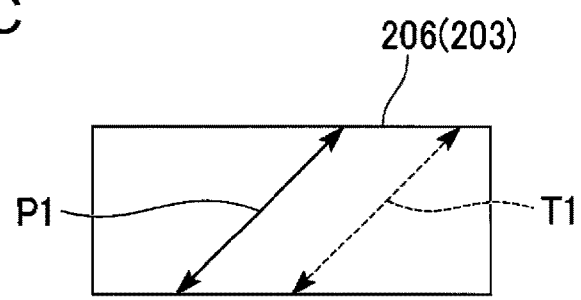
FIG. 16C is a front view illustrating a relationship in an optical axis between the polarizing film and the retardation film on the backlight side.

On the contrary, for example, as illustrated in FIG. 16B, it is assumed that a direction of the absorption axis P2 of the light diffusion film 207 matches with a direction which forms an angle of 45° along with the longitudinal direction (horizontal direction) of the light diffusion member 206 obtained by dicing. At this time, as illustrated in FIG. 16C, the direction of the absorption axis P1 of the first polarizing film 203 matches with a direction which forms an angle of 45° along with the short direction (vertical direction) of the light diffusion member 206 obtained by dicing. In this case, when the base material for light diffusion member production is subjected to dicing, as illustrated in FIG. 16A, the base material for light diffusion member production is necessarily cut along cutting-plane lines S which form an angle of 45° along with the longitudinal direction and the short direction of the base material for light diffusion member production 205. In this case, small pieces of which a use as the light diffusion member 206 is not possible are generated from the base material for light diffusion member production 205. In addition, an increase of the number of pieces of the light diffusion members 206 obtained from the base material for light diffusion member production 205 which has a prescribed area is not possible.

Finally, as illustrated in FIG. 2, the completed light diffusion member 6 is stuck to the liquid crystal panel 5 by using the adhesive layer 51, in a state where the first substrate 39 side of the light diffusion film 7 is directed toward the viewing side, and the retardation layer 56 side of the second retardation film 9 faces the liquid crystal panel 5. The adhesive layer 51 is formed from an optical adhesive. The first retardation film 4 and the first polarizing film 3 are stuck to the back side (side which faces the backlight 2) of the liquid crystal panel 5, in this order. Similarly to the light diffusion member 6, the first retardation film 4 and the first polarizing film 3 may be stuck to each other before being stuck to the liquid crystal panel 5.

The liquid crystal display device 1 according to the embodiment is completed through the above processes.

As described above, the first retardation film 3 and the second retardation film 9 which are formed from polymer of the discotic compound 96 are respectively provided on the viewing side and the back side of the liquid crystal panel 5 in the TN mode. Thus, each of the retardation films performs optical compensation on oriented components of the liquid crystal layer 11 when a voltage is applied. Dependency of viewing angle characteristics on azimuth is reduced. However, when black is displayed on the liquid crystal panel 5, the polar angle is largely shifted from the front direction of the screen, that is, the normal direction of the liquid crystal panel 5. Thus, the quantity of leaked light is increased, and contrast is degraded.

Figure 18A:
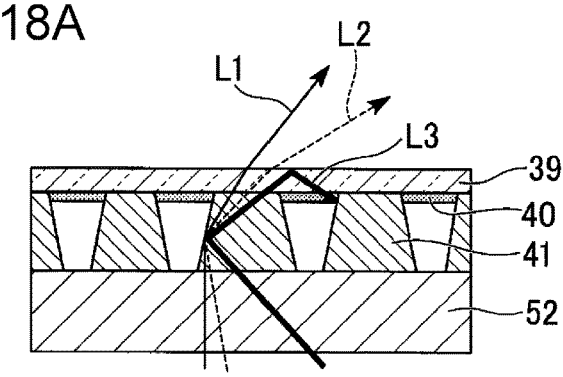
FIG. 18A is a diagram illustrating an action of the light diffusion film.
Figure 18B:
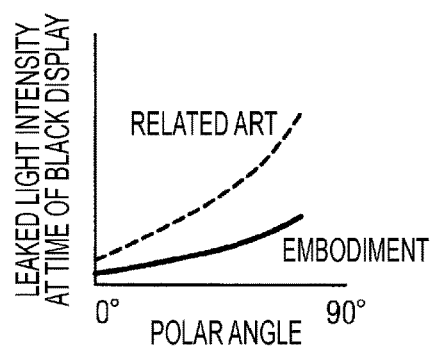
FIG. 18B is a diagram obtained by comparing the embodiment and the conventional example to each other in leaked light intensity during black display.
Figure 18C:
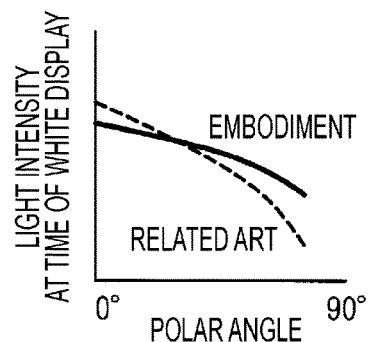
FIG. 18C is a diagram obtained by comparing the embodiment and the conventional example to each other in light intensity during white display.
Figure 18D:
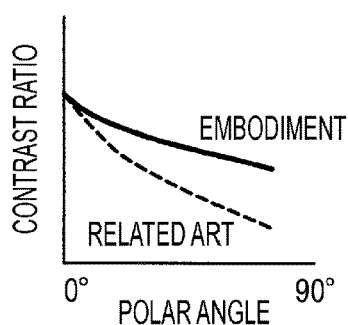
FIG. 18D is a diagram obtained by comparing the embodiment and the conventional example to each other in contrast ratio.

On the contrary, according to the light diffusion member 6 in the embodiment, the light diffusion film 7 obtained by integrating the films is provided on the viewing side of the second retardation film 9 and the second polarizing film 8. Thus, as indicated by the reference signs L1 and L2 in FIG. 18A, the liquid crystal layer is inclined, and thus it is possible to cause light leaked when black is displayed to be reflected to a wide angle side more. In addition, a portion of light L3 emitted from a direction in which the polar angle is large is totally reflected by the surface of the first substrate 39 when black is displayed. Thus, it is possible to cause the light shielding layer 40 to absorb the light which has been totally reflected. Accordingly, as illustrated in FIG. 18B, it is possible to reduce the quantity of light leaked from the direction in which the polar angle is large. As illustrated in FIG. 18C, a portion of light emitted in the front direction of the screen when white is displayed can be divided to the direction in which the polar angle is larger. As a result, according to the light diffusion member 6 of the embodiment, as illustrated in FIG. 18D, it is possible to realize a liquid crystal display device having a wide angular range which allows viewing of high contrast display.

[Second Embodiment]

A second embodiment according to the present invention will be described below with reference to FIGS. 19 to 21.

The basic configuration of the light diffusion member in the second embodiment is similar to that of the first embodiment, and thus, only a point in that the fourth substrate is not used is different.

Figure 19:
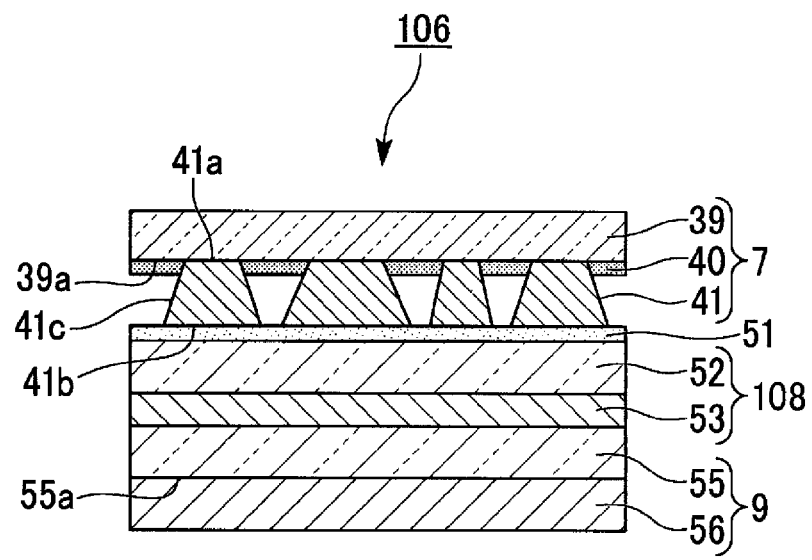
FIG. 19 is a sectional view illustrating a light diffusion member according to a second embodiment.
Figure 20:
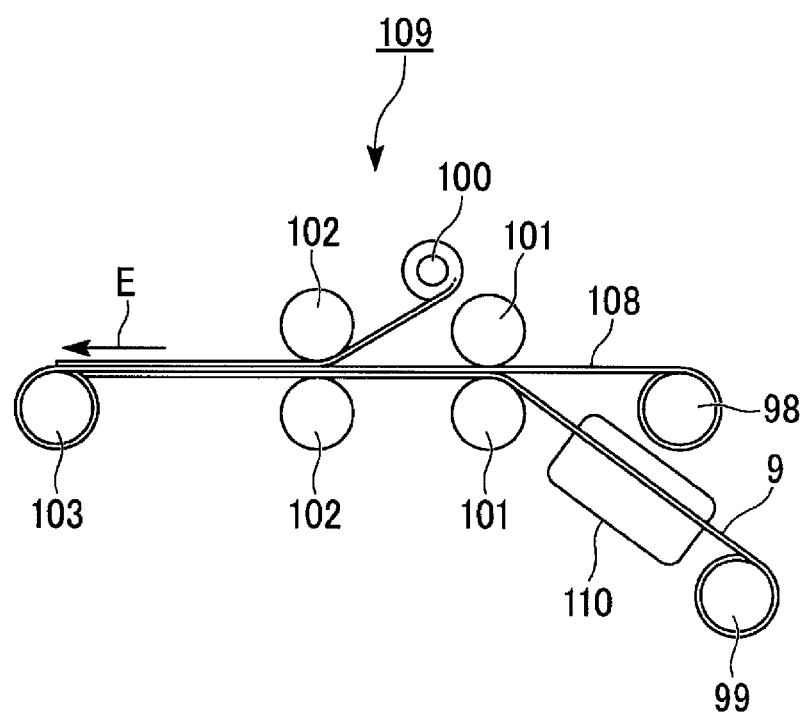
FIG. 20 is a diagram illustrating a device of producing the light diffusion member.
Figure 21:
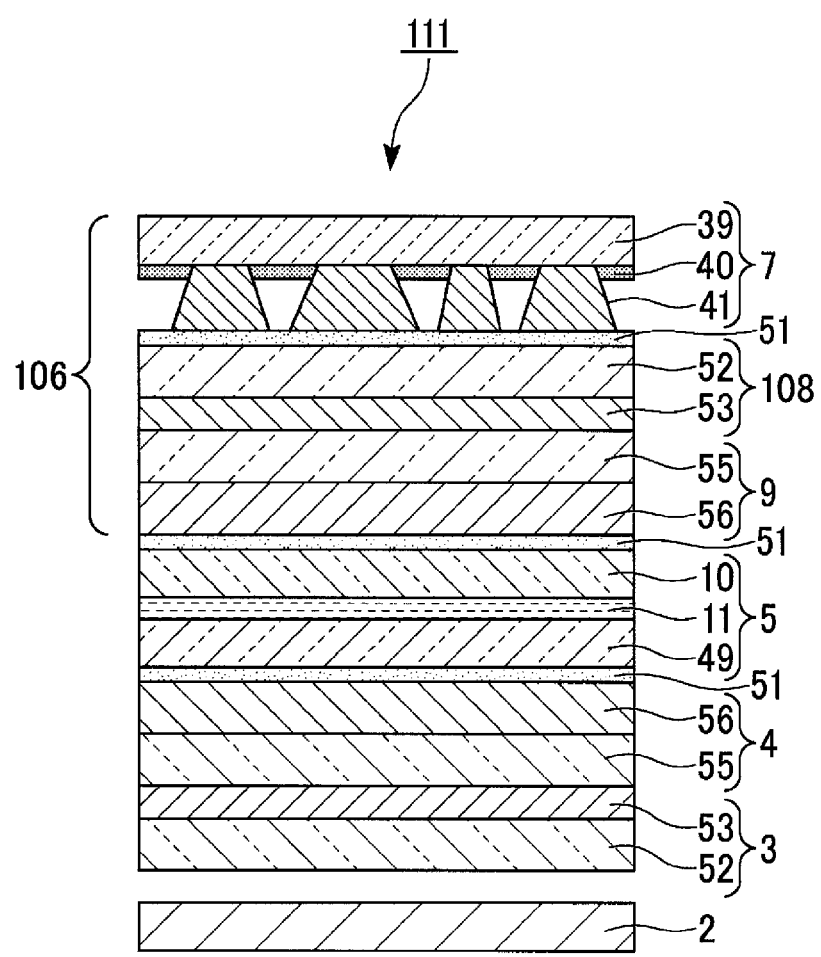
FIG. 21 is a sectional view illustrating a liquid crystal display device according to the second embodiment.

In FIGS. 19 to 21, common components which are used in the first embodiment and are illustrated in FIGS. 2, 4, 14, and the like are denoted by the same reference signs, and detailed descriptions thereof will be omitted.

As illustrated in FIG. 19, in the light diffusion member 106 according to the second embodiment, the polarization layer 53 of the second polarizing film 108 is directly in contact with the third substrate 55 of the second retardation film 9. That is, the light diffusion member 106 in this embodiment has a configuration in which the fourth substrate 54 and the adhesive layer 51 are excluded from the light diffusion member 6 in the first embodiment. In other words, in the light diffusion member 106 in the second embodiment, the third substrate 55 is commonly used as a substrate of the second retardation film 9 and a substrate of the second polarizing film 108. Other components are similar to those in the first embodiment.

FIG. 20 illustrates a film laminating device 109 used when the light diffusion member 106 according to the second embodiment is produced.

In this embodiment, a saponification treatment device 110 is provided on a downstream side of the retardation film sending roller 99. The second retardation film 9 is subjected to saponification treatment by using an alkali solution which is supplied from the saponification treatment device 110. Thus, adhesion between the third substrate (TAC film) 55 of the second retardation film 9, and the polarization layer (polyvinyl alcohol layer) 53 is improved. Although illustration is omitted, even in the second polarizing film 8, in order to improve adhesion between the second substrate 52 and the polarization layer (polyvinyl alcohol layer) 53, the second substrate 52 is subjected to saponification treatment, and then the second substrate 52 and the polarization layer 53 are stuck to each other. Lamination of the third substrate 55 and the polarization layer 53, and lamination of the second substrate 52 and the polarization layer 53 may be performed simultaneously.

FIG. 21 illustrates a liquid crystal display device 111 in which the light diffusion member 106 in the second embodiment illustrated in FIG. 19 is stuck to the viewing side of the liquid crystal panel 5. The first retardation film 4 and a first polarizing film 112 are laminated on the back side (backlight 2 side) of the liquid crystal panel 5, in this order from the liquid crystal panel 5 side. The first retardation film 4 and the first polarizing film 112 also have a configuration in which the fourth substrate 54 and the adhesive layer 51 are excluded from the configuration in the first embodiment. That is, the third substrate 55 is commonly used as a substrate of the first retardation film 4 and a substrate of the first polarizing film 112. Other components are similar to those in the first embodiment.

In the light diffusion member 106 according to the second embodiment, an advantage similar to that in the first embodiment is obtained in that a liquid crystal display device having a wide angular range which allows viewing of high contrast display can be realized. In a case of this embodiment, one piece of the third substrate (TAC film) 55 may be not provided on each of the viewing side and the back side of the liquid crystal panel 5, and thus the liquid crystal display device 111 having a thinner thickness is obtained.

[First Modification Example]

Figure 22:
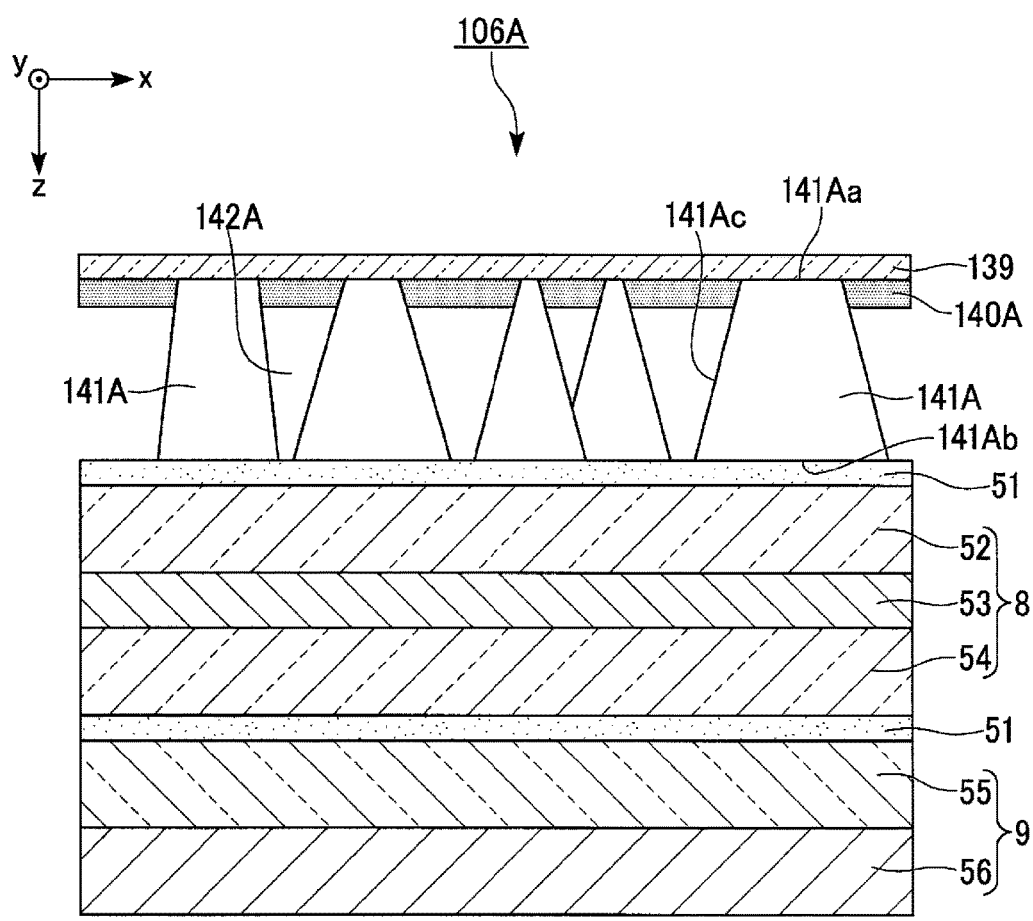
FIG. 22 is a sectional view illustrating a light diffusion member according to a first modification example.

FIG. 22 is a sectional view illustrating a light diffusion member 106A according to a first modification example of the first embodiment.

In the first embodiment, all of inclination angles of the reflective surface of the plurality of light diffusion portions 141 are the same as each other. On the contrary, in the light diffusion member 106A in this modification example, as illustrated in FIG. 22, inclination angles of the reflective surface 141Ac of the plurality of light diffusion portions 141A are different from each other. That is, when the entirety of the plurality of light diffusion portion 141A is viewed, light-emitting end surfaces 141Aa of the plurality of light diffusion portions 141A have plural types of dimensions, and reflective surfaces 141Ac of the plurality of light diffusion portions 141A have plural types of inclination angles. Because the inclination angles of the reflective surfaces 141Ac of the plurality of light diffusion portions 141A are different from each other, and thus the dimensions of the light incident end surfaces 141Ab are different from each other. Other components are similar to those in the first embodiment.

Even in a case where the light diffusion member 106A according to the modification example is provided, an advantage similar to that in the first embodiment is obtained in that a liquid crystal display device having a wide angular range which allows viewing of high contrast display can be realized.

[Second Modification Example]

Figure 23A:
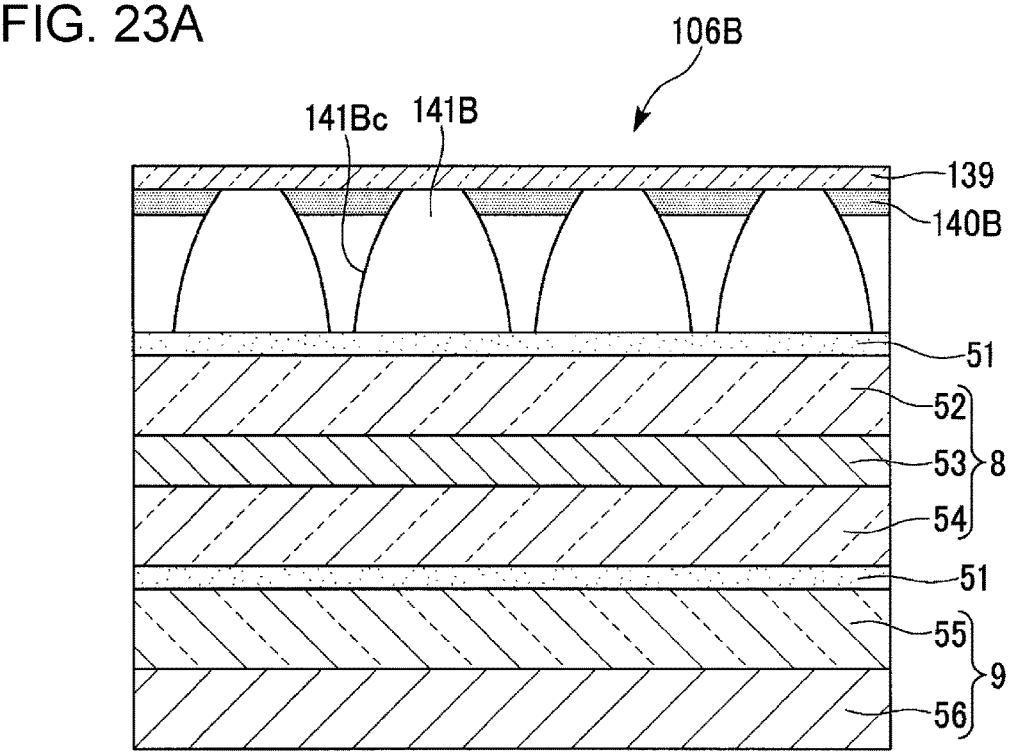
FIG. 23A is a first sectional view illustrating a light diffusion member according to a second modification example.
Figure 23B:
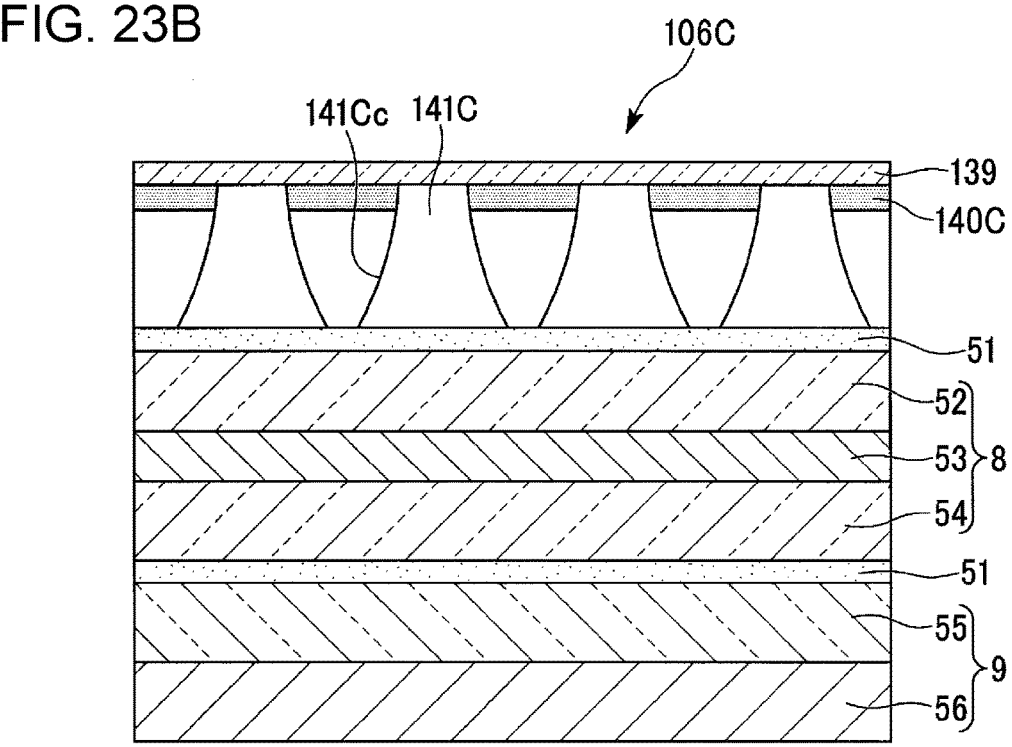
FIG. 23B is a second sectional view illustrating the light diffusion member according to the second modification example.

FIGS. 23A and 23B are sectional views of light diffusion members 106B and 106C according to a second modification example of the first embodiment, respectively.

In the first embodiment, the inclination angle of the reflective surface 141c of the light diffusion portion 141 is constant.

On the contrary, as illustrated in FIGS. 23A and 23B, each of inclination angles of reflective surfaces 141Bc and 141Cc of the light diffusion portions 141B and 141C in this modification example varies depending on a location. Specifically, in each of the reflective surfaces 141Bc and 141Cc of the light diffusion portions 141B and 141C in this modification example, the inclination angle is continuously changed.

In the light diffusion member 106B illustrated in FIG. 23A, the reflective surface 141Bc of the light diffusion portion 141B is bent outwardly.

In the light diffusion member 106C illustrated in FIG. 23B, the reflective surface 141Cc of the light diffusion portion 141C is bent inwardly.

According to the configuration in the modification example, it is possible to improve optical diffusibility in comparison to the configuration in the first embodiment.

[Third Modification Example]

Figure 24A:
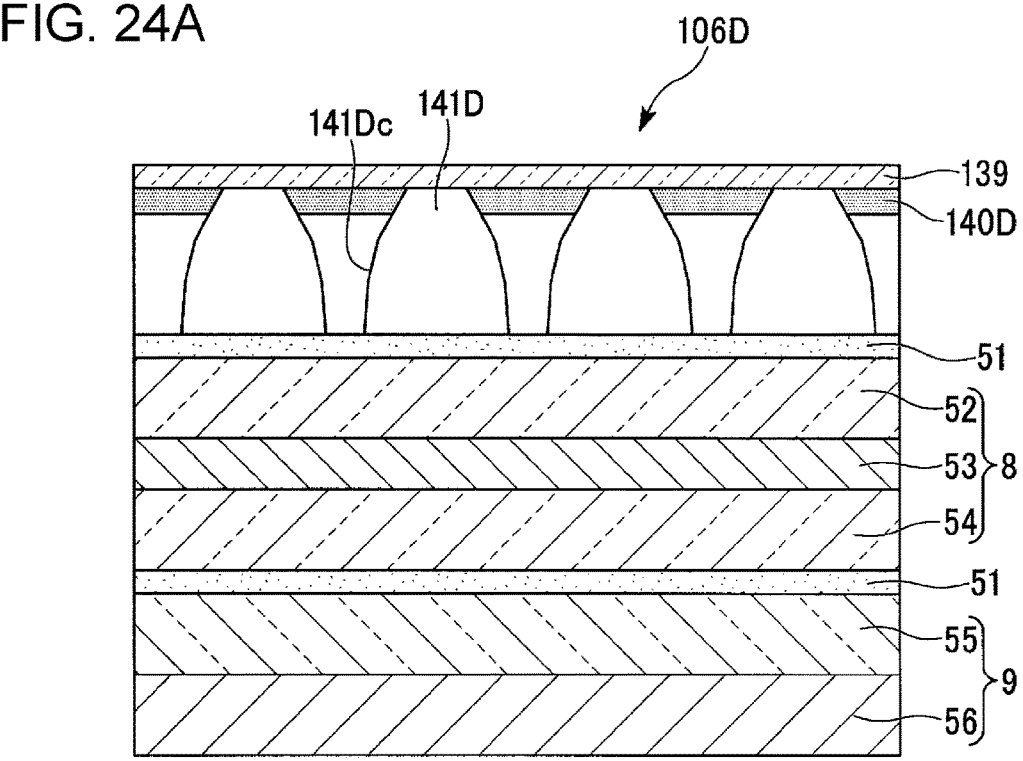
FIG. 24A is a first sectional view illustrating a light diffusion member according to a third modification example.
Figure 24B:
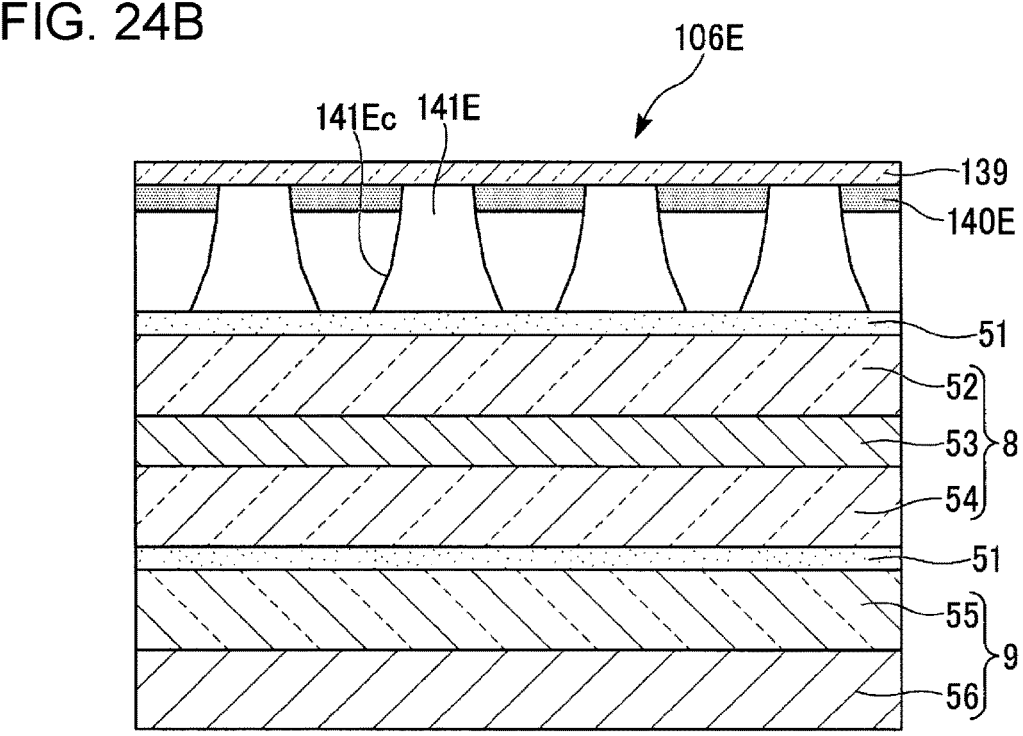
FIG. 24B is a second sectional view illustrating the light diffusion member according to the third modification example.

FIGS. 24A and 24B are sectional views of light diffusion members 106D and 106E according to a third modification example of the first embodiment, respectively.

In the first embodiment, the inclination angle of the reflective surface 141c of the light diffusion portion 141 is constant.

On the contrary, as illustrated in FIGS. 24A and 24B, each of inclination angles of reflective surfaces 141Dc and 141Ec of the light diffusion portions 141D and 141E in this modification example varies depending on a location. Specifically, each of the reflective surfaces 141Dc and 141Ec of the light diffusion portions 141D and 141E in this modification example has plurality of different inclination angles (inclined surface of which a sectional shape is a polygonal line shape).

In the light diffusion member 106D illustrated in FIG. 24A, the reflective surface 141Dc of the light diffusion portion 141D has three inclined surfaces of which inclination angles are different from each other, and has a shape in which protruding is performed outwardly.

In the light diffusion member 106E illustrated in FIG. 24B, the reflective surface 141Ec of the light diffusion portion 141E has three inclined surfaces of which inclination angles are different from each other, and has a shape in which protruding is performed inwardly.

According to the configuration in this modification example, it is possible to improve optical diffusibility in comparison to the configuration in the first embodiment.

Figure 25A:
FIG. 25A is a first plan view illustrating another example of a light shielding layer of the light diffusion member.

In the first embodiment, the shape of the light shielding layer 40 is set to be an elongated oval shape as illustrated in FIG. 25A. However, the shape of the light shielding layer 40 is not limited thereto.

Figure 25B:
FIG. 25B is a second plan view illustrating still another example of the light shielding layer of the light diffusion member.

For example, as illustrated in FIG. 25B, a light shielding layer 40G having an elongated rectangular shape may be used.

Figure 25C:
FIG. 25C is a third plan view illustrating still another example of the light shielding layer of the light diffusion member.

In addition, as illustrated in FIG. 25C, a light shielding layer 40H having an elongated octagonal shape may be used.

Figure 25D:
FIG. 25D is a fourth plan view illustrating still another example of the light shielding layer of the light diffusion member.
Figure 25E:
FIG. 25E is a fifth plan view illustrating still another example of the light shielding layer of the light diffusion member.
Figure 25F:
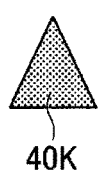
FIG. 25F is a sixth plan view illustrating still another example of the light shielding layer of the light diffusion member.
Figure 25G:
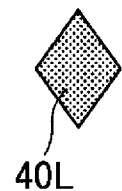
FIG. 25G is a seventh plan view illustrating still another example of the light shielding layer of the light diffusion member.

In addition, as illustrated in FIG. 25D, a light shielding layer 40I in which two sides which face each other in the elongated rectangular shape are bent outwardly may be used. In addition, as illustrated in FIG. 25E, a light shielding layer 40J having a shape which is obtained in such a manner that two rectangles having different aspect ratios intersect with each other in two directions which are perpendicular to each other may be used. In addition, as illustrated in FIG. 25F, a light shielding layer 40K having an isosceles triangle shape may be used. In addition, as illustrated in FIG. 25G, a light shielding layer 40L having a rhomboid shape may be used. The shape of each of FIGS. 25A to 25G may be rotated in a prescribed direction.

The planar shapes of the light shielding layers 40 may be caused to be different from each other, and layers of plural types of different sizes or shapes which have various types of anisotropic azimuth (see FIGS. 25A to 25G) may be mixed with each other.

A configuration in which at least one of an antireflection layer, a polarizing filter layer, an antistatic layer, an antiglare treatment layer, and an antifouling treatment layer is provided on the viewing side of the first substrate in the light diffusion member according to the embodiments may be made.

According to this configuration, it is possible to add a function of reducing the quantity of light which has been reflected outwardly, a function of preventing adhering of dust or dirt, a function of preventing occurrence of damage, and the like, in accordance with the type of layer provided on the viewing side of a substrate. It is possible to suppress time degradation of the viewing angle characteristics.

The technical range of the present invention is not limited to the above embodiments. Various changes can be made in a range without departing from the gist of the present invention.

For example, in the above embodiments, a shape of the light diffusion portion or the space portion is set to be an elliptical frustum shape. However, other shapes may be applied. The inclination angles of the reflective surfaces of the light diffusion portions may be not necessarily symmetric to each other by using the optical axis as the center. As in the above embodiment, in a case where the shape of the light diffusion portion is set to be an elliptical frustum shape, the inclination angles of the reflective surfaces of the light diffusion portions have line symmetry by using the optical axis as the center. Thus, line symmetric angular distribution by using the optical axis as the center is obtained. On the contrary, in a case where an asymmetric angular distribution is intentionally required in accordance with a user or a using type of the display device, for example, in a case where a request of providing the wide viewing angle only on the upper side of the screen, or only on the right side of the screen is provided, the inclination angles of the reflective surfaces of the light diffusion portions may be asymmetric.

In addition, a specific configuration relating to materials, the number, disposition, and the like of components of the liquid crystal display device is not limited to the above embodiments, and may be appropriately changed. For example, in the embodiments, a case where the light diffusion film includes the first substrate having optical transparency, the plurality of light shielding layers formed on the first surface of the first substrate, and the light diffusion portion formed in the region of the first surface in the first substrate, other than the region in which the light shielding layer is formed is exemplified. However, the present invention is not limited thereto. In the present invention, the light diffusion film may include the first substrate having optical transparency, a plurality of light diffusion portions which are randomly formed when viewed from the normal direction of the first surface of the first substrate, and the light shielding layer formed in the region of the first surface in the first substrate, other than the region in which the plurality of light diffusion portions is formed. That is, the region in which the light diffusion portion is formed, and the region in which a shielding portion is formed may be reversed to each other.

Industrial Applicability

The present invention can be used for various display devices such as a liquid crystal display device, an organic electroluminescence display device, a plasma display, a LED display, and a MEMS display.

REFERENCE SIGNS LIST 1, 111 LIQUID CRYSTAL DISPLAY DEVICE
6, 106 LIGHT DIFFUSION MEMBER
7 LIGHT DIFFUSION FILM
8, 108 SECOND POLARIZING FILM
9 SECOND RETARDATION FILM
39 FIRST SUBSTRATE
40 LIGHT SHIELDING LAYER
41 LIGHT DIFFUSION PORTION
52 SECOND SUBSTRATE
53 POLARIZATION LAYER
54 FOURTH SUBSTRATE
55 THIRD SUBSTRATE
56 RETARDATION LAYER
105 BASE MATERIAL FOR LIGHT DIFFUSION MEMBER PRODUCTION

The invention claimed is:

1. A light diffusion member comprising:
a light diffusion film;
a polarizing film; and
a retardation film, wherein
the light diffusion film includes:
   a first substrate which has optical transparency,
   a light diffusion portion which is provided on a first surface of the first substrate, and
   light shielding layers which are provided in a region of the first surface of the first substrate, other than a region in which the light diffusion portion is provided,
the light diffusion portion includes:
   a light-emitting end surface which is in contact with the first substrate, and
   a light incident end surface which faces the light-emitting end surface and has an area larger than an area of the light-emitting end surface,
a height from the light incident end surface to the light-emitting end surface is larger than a thickness of the light shielding layers,
each of the light shielding layers has a long axis and a short axis, and the long axis is in a first direction,
the polarizing film includes:
   a second substrate which has optical transparency and is disposed on the light incident end surface side of the light diffusion portion, and
   a polarization layer which has a transmission axis and an absorption axis which are provided on a first surface of the second substrate, the transmission axis and the absorption axis of the polarization layer are orthogonal to each other, and the absorption axis is in the first direction, the retardation film includes:
a third substrate which has optical transparency and is disposed on an opposite side of a side of the polarizing film, on which the light diffusion film is disposed, and
a retardation layer which is defined by a birefringence body which has optically-negative uniaxiality and is provided on the first surface of the third substrate, and in which an alignment direction of the birefringence body is different in a thickness direction, and
a slow axis of the retardation layer is positioned at azimuth between the transmission axis and the absorption axis of the polarization layer.

2. The light diffusion member according to claim 1, wherein the birefringence body which has optically-negative uniaxiality is polymer of a discotic compound.

3. The light diffusion member according to claim 1, wherein an azimuthal angle between the slow axis of the retardation layer and the transmission axis of the polarization layer is about 45°.

4. The light diffusion member according to claim 1, wherein
the polarizing film further includes a fourth substrate which performs interposition of the polarization layer along with the second substrate, and
the third substrate and the fourth substrate are bonded to each other.

5. The light diffusion member according to claim 1, wherein the polarization layer and the third substrate are bonded to each other.

6. The light diffusion member according to claim 1, wherein a member interposed between the polarizing film and the first substrate has a refractive index which is in a range between a refractive index of the polarizing film and a refractive index of the first substrate.

7. The light diffusion member according to claim 1, further comprising:
a buffer layer which is provided between the light diffusion portion of the light diffusion film and the polarizing film.

8. The light diffusion member according to claim 1, wherein
the light shielding layers are disposed so as to be dotted when viewed from a normal direction of the first surface of the first substrate, and
the light diffusion portion is continuously provided in a region other than a region in which the light shielding layers are provided.

9. The light diffusion member according to claim 8, wherein the light shielding layers are aperiodically disposed when viewed from the normal direction of the first surface of the first substrate.

10. The light diffusion member according to claim 8, wherein the shielding layers include light shielding layers which have a size different from each other.

11. The light diffusion member according to claim 8, wherein
an air cavity obtained by partition of the light diffusion portion is defined in the region in which the light shielding layers are provided, and
the air cavity is filled with air.

12. The light diffusion member according to claim 8, wherein a planar shape of each of the light shielding layers when viewed from the normal direction of the first surface of the first substrate is circular, oval, or polygonal.

13. The light diffusion member according to claim 1, wherein an inclination angle of a side surface of one light diffusion portion varies depending on a location of the light diffusion portion.

14. The light diffusion member according to claim 1, wherein at least one of an antireflection layer, an antistatic layer, an antiglare treatment layer, and an antifouling treatment layer is provided on a second surface of the first substrate.

15. The light diffusion member according to claim 1, wherein the light shielding layers are defined by any of black resin, a black ink, metal singleton, and a laminated film of metal singleton and metal oxide.

16. A display device comprising:
a display body; and
a light diffusion member which is provided on a light outgoing side of the display body, and causes an angular distribution of light incident from the display body to be wider than an angular distribution of light before the light is incident, so as to emit the light, wherein
the light diffusion member is the light diffusion member according to claim 1.

17. The display device according to claim 16, wherein
the display body has a plurality of pixels for forming a display image, and
the maximum pitch between light diffusion portions which are adjacent to each other among the plurality of light diffusion portions in the light diffusion member is smaller than a pitch between the pixels in the display body.

18. A base material for light diffusion member production comprising:
a plurality of regions in which the light diffusion member according to claim 1 is formed.

19. The base material for light diffusion member production according to claim 18, wherein a region in which the light shielding layers and the light diffusion portion are not provided is provided at a circumferential portion of the first surface of the first substrate.

20. A method of producing a light diffusion member, the method comprising:
a step of manufacturing a light diffusion film which includes a first substrate having optical transparency, a light diffusion portion provided on a first surface of the first substrate, and light shielding layers provided in a region of the first surface of the first substrate, other than a region in which the light diffusion portion is provided, wherein each of the light shielding layers has a long axis and a short axis, and the long axis is in a first direction,
a step of manufacturing a polarizing film which includes a second substrate having optical transparency, and a polarization layer which is provided on a first surface of the second substrate, and has a transmission axis and an absorption axis;
a step of manufacturing a retardation film which includes a third substrate having optical transparency, and a retardation layer which is provided on a first surface of the third substrate, and is formed from a layer in which an alignment direction of a birefringence body having optically-negative uniaxiality is different in a thickness direction;
a step of sticking the retardation film and the polarizing film to each other in a direction in which a slow axis of the retardation layer is positioned at azimuth between the transmission axis and the absorption axis of the polarization layer; and a step of sticking the polarizing film and the light diffusion film to each other, wherein the light diffusion portion includes a light-emitting end surface being in contact with the first substrate, and a light incident end surface which faces the light-emitting end surface and has an area lager than an area of the light-emitting end surface, the transmission axis and the absorption axis of the polarization layer are orthogonal to each other, and the absorption axis is in the first direction, and a height from the light incident end surface to the light-emitting end surface is larger than a thickness of the light shielding layers.

* * * * *